US010217126B2

(12) United States Patent
Upadhya et al.

(10) Patent No.: US 10,217,126 B2
(45) Date of Patent: Feb. 26, 2019

(54) DISTRIBUTED MARKETING PLATFORM

(71) Applicant: SproutLoud Media Networks, LLC., Sunrise, FL (US)

(72) Inventors: Anjan Upadhya, Pembroke Pines, FL (US); Jared Shusterman, Miami Beach, FL (US)

(73) Assignee: SproutLoud Media Networks, LLC, Sunrise, FL (US)

( * ) Notice: Subject to any disclaimer, the term of this patent is extended or adjusted under 35 U.S.C. 154(b) by 393 days.

(21) Appl. No.: 13/912,699

(22) Filed: Jun. 7, 2013

(65) Prior Publication Data

US 2014/0365284 A1 Dec. 11, 2014

(51) Int. Cl.
*G06Q 30/02* (2012.01)

(52) U.S. Cl.
CPC ................................ *G06Q 30/0241* (2013.01)

(58) Field of Classification Search
CPC ..... G06Q 30/02; G06Q 40/02; G06F 21/6218
USPC ........................................................... 705/14
See application file for complete search history.

(56) References Cited

U.S. PATENT DOCUMENTS 7,047,416 B2 5/2006 Wheeler et al.
7,665,657 B2 2/2010 Huh
8,424,069 B2 * 4/2013 Weatherston ........... G06F 21/31 726/6
9,087,208 B2 * 7/2015 Ibel ..................... G06F 21/6218
2008/0077489 A1 3/2008 Gilley et al.
2008/0254766 A1 * 10/2008 Craven ................. H04W 8/183 455/407
2009/0171805 A1 * 7/2009 Gould .................... G06Q 20/40 705/26.1
2010/0217805 A1 8/2010 Lavoie et al.
2011/0029902 A1 * 2/2011 Bailey ..................... G06F 21/36 715/764
2011/0113235 A1 5/2011 Erickson
2011/0138175 A1 6/2011 Clark et al.

(Continued)

OTHER PUBLICATIONS

Patent Cooperation Treaty, "International Search Report and Written Opinion of the International Searching Authority," International Application No. PCT/US2014/041119, document of 9 pages, dated Oct. 23, 2014.

*Primary Examiner* — Fonya M Long
*Assistant Examiner* — Thuy N Nguyen
(74) *Attorney, Agent, or Firm* — Akerman LLP; Mammen (Roy) P. Zachariah, Jr.

(57) ABSTRACT

A system for providing access to a distributed marketing platform is disclosed. In particular, the system may be utilized to allow a local marketer to access marketing resources for one or more brands through the use of a sub-account. The system may generate the sub-account for the local marketer, which may be utilized by the local marketer to access a master account associated with a particular brand that the local marketer desires to connect with. Access to the master account and its resources may be granted to the sub-account if the local marketer submits valid key and account information to an online portal associated with the master account. Additionally, the sub-account may be allowed to connect to other master accounts associated with other brands by using the online portal and without violating master account agreements of direct-solicitation and cross-promotion of the master accounts to the sub-account.

12 Claims, 19 Drawing Sheets

(56) References Cited

U.S. PATENT DOCUMENTS

| | | | | |
|---|---|---|---|---|
| 2011/0191417 | A1* | 8/2011 | Rathod | G06Q 30/02 709/204 |
| 2012/0323661 | A1 | 12/2012 | Otto et al. | |
| 2013/0282481 | A1* | 10/2013 | Kent | G06Q 30/0251 705/14.49 |
| 2014/0222843 | A1* | 8/2014 | Sareen | H04L 67/1097 707/755 |
| 2014/0304790 | A1* | 10/2014 | Bi | G06F 21/10 726/7 |

* cited by examiner

HOME
NEW ACCOUNT CREATION                                    [BACK]
WE COULDN'T LOCATE YOUR ACCOUNT. CONTINUE CREATING A NEW ACCOUNT BY FILLING OUT THE FORM BELOW. IF
YOU BELIEVE YOU ALREADY HAVE AN ACCOUNT WITH SPROUTLOUD. CLICK HERE TO TRY AGAIN.

USER IDENTIFICATION & SECURITY
EMAIL *
[VMUDRAGADDA@SPROUTLOUD.COM]
USER ID *
[                    ]
USER ID MUST START WITH A LETTER, CONTAIN ONLY LETTERS AND NUMBERS AND BE BETWEEN 6 AND 15 CHARACTERS LONG
PASSWORD *
[          ]          [          ]
PASSWORD              CONFIRM PASSWORD
PASSWORDS MUST CONTAIN A MIX OF LETTERS AND NUMBERS AND BE BETWEEN 6 AND 20 CHARACTERS LONG.
NOTE: PASSWORDS CANNOT CONTAIN YOUR USER ID.
SECURITY QUESTION *
[-SELECT A QUESTION-          ▽]
SECURITY ANSWER *
[                    ]

CONTACT INFORMATION
COMPANY NAME *
[SETWORKS]
NAME *
[GEETHA]          [    ]          [BOSE]
FIRST NAME        MIDDLE NAME     LAST NAME
ADDRESS
[3260 BELVIDERE AVE]
ADDRESS1 *
[                    ]
ADDRESS2 *
[UNITED STATES OF AMERICA ▽]   [98126-2225]
COUNTRY *                       POSTAL CODE *
[WASHINGTON              ▽]   [SW SEATLE]
STATE/PROVINCE/REGION CODE *    CITY *
PHONE *
[9547898798]                    [              ]
PHONE NUMBER                    EXTENSION
FAX
[              ]                [              ]
PHONE NUMBER                    EXTENSION

LOCAL PREFERENCES
TIME ZONE *
[-SELECT A TIME ZONE-     ▽]
LANGUAGES *
[-SELECT A LANGUAGE-      ▽]
⚠ YOUR CURRENCY CANNOT BE CHANGED ONCE YOUR ACCOUNT IS CREATED. PLEASE REVIEW YOUR CHOICE CARFULLY AND THEN CLICK "CREATE"
CURRUNCY *
[-SELECT CURRENCY-        ▽]
☐ AGREEE TO SPROUTLOUD'S TERMS AND CONDITIONS *
☐ I AGREE TO TEST*
[CREATE]

1500

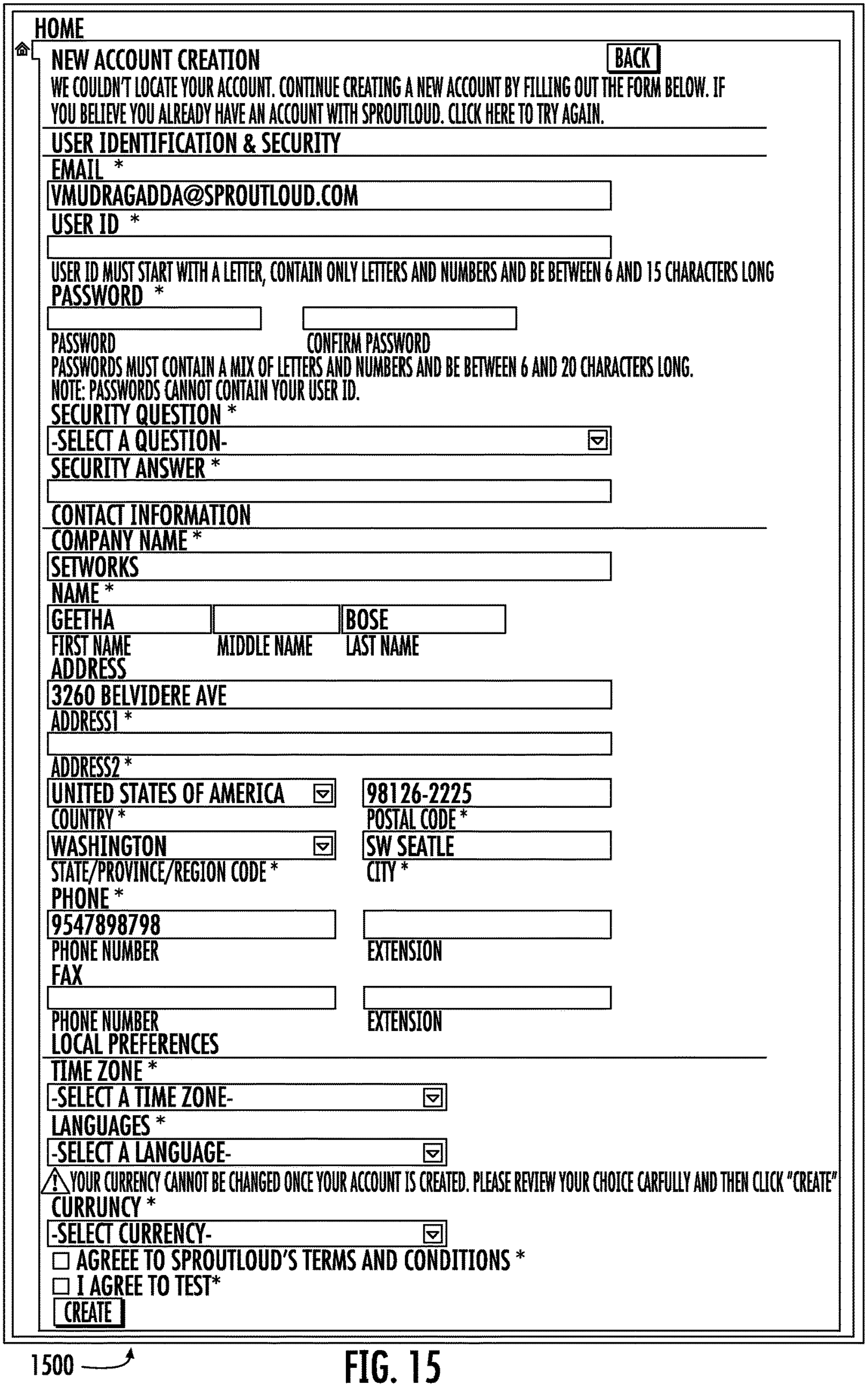

FIG. 15

SALES NETWORKS

DISTRIBUTED MARKETING PLATFORM

FIELD OF THE INVENTION

The present application relates to marketing resource management systems and methods, and more particularly, to systems and methods for providing access to a distributed marketing platform.

BACKGROUND

In today's technology driven society, people and businesses are increasingly utilizing communication networks, such as the Internet or other networks, to access various types of software services, perform job functions, access various types of resources, consume various types of content, conduct and participate in business transactions, and carry out a variety of other tasks and functions. For example, a local marketer or affiliate of a national brand may access a custom website developed by a national brand to access various types of marketing resources provided by the national brand. Such marketing resources may include, but are not limited to, direct mail materials, promotional catalogs, electronic mail promotional materials, marketing programs, national brand advertisements, and other marketing resources. The local marketer may utilize such resources to promote the national brand and products associated with the national brand directly to the local marketer's customers.

Currently, however, local marketers are often relegated to using a different website or other software-based marketing platform for accessing various types of marketing resources for each different national brand that the local marketers are affiliated with or choose to be affiliated with. As a result, this forces the local marketers to adapt to multiple different software platforms, which may not offer the same types of services, may provide different ways of accessing similar marketing resources or services, may offer varying levels of reliability, and may provide different user experiences. Additionally, when local marketers generate data when using the various software platforms, such data cannot readily be shared between the platforms. As a result, local marketers often have to spend additional time and resources to unnecessarily replicate this data.

While currently existing marketing platforms often have some advantages, there are also quite a few disadvantages associated with such platforms. For example, traditional marketing platforms often require spending a significant amount of resources to train company employees to learn how to effectively use each different platform for each national brand, are often difficult to integrate with the local marketer's existing systems, and are often not readily customizable. Additionally, as the widespread use of mobile devices, such as smartphones, laptops, and computer tablets continues to increase, along with the proliferation of social networking, people are increasingly utilizing such mobile devices to access marketing resources, to perform work, and to interact with other people. As a result, software-based marketing platforms need to continue to evolve to satisfy ever-changing needs and demands.

SUMMARY

A system and accompanying methods for providing access to a distributed marketing platform are disclosed. In particular, the systems and methods may allow for a local marketer or affiliate to access the various marketing resources or other content provided by multiple brands within the same cohesive online portal, while also ensuring that agreements between the local marketers and the national brands are not violated and that confidential information from one brand is kept separate from another brand. For the purposes of this disclosure, a local marketer or affiliate may be associated with a sub-account, and a brand may be associated with a master account. Each brand may register a master account with the online portal and upload or otherwise provide various types of marketing resources to the online portal so that they are made accessible to authorized sub-accounts. In order to authorize a designated sub-account with access to the brands marketing resources, the master account may generate a unique key, set up rules associated with accessing the marketing resources, and associate the rules with the key. The master account may transmit the key to a potential new sub-account, and a user associated with the sub-account may submit a key into the online portal.

If the online portal determines that the key submitted by the user of the sub-account is not valid and does not match the key generated by the master account, then the sub-account may be prevented from registering with the online portal and, as a result, may be prevented from accessing the resources of the master account. However, if the online portal determines that the key submitted by the user of the sub-account was valid and matches the key generated by the master account, then the system may enable the sub-account to register with the online portal. Once registered, the sub-account may access the resources of the master account via the online portal. This process may be repeated for additional master accounts such that the sub-account may gain access to multiple master accounts for varying brands within the same online portal. When a user of the sub-account logs into the online portal, the online portal may present each master account that the sub-account is connected to as a separate "network" on a graphical user interface so as to ensure that a given master account is separately accessible from another master account. As a result, a user of the sub-account may seamlessly access multiple master accounts within the same online portal and experience similar user experiences when accessing the different master accounts.

In one embodiment, a system for providing access to a distributed marketing platform is disclosed. The system may include a memory that stores instructions and a processor that executes the instructions to performing various operations of the system. The processor may be associated with an online portal that is associated with a master account of a particular brand. An operation of the system may include transmitting a first key to a device of a user. The key may be utilized to provide access to resources, such as marketing resources, provided by the master account. The system may then perform an operation comprising receiving, at the online portal, a second key from the device of the user. The system may perform another operation that comprises transmitting, to the device of the user, a prompt to register a sub-account with the online portal if the system determines that the second key matches the first key. In one embodiment, the sub-account may identify the user as a local affiliate or local marketer of a brand of the master account. The system may then perform an operation that comprises receiving, from the device of the user, a request to register the sub-account with the online portal in response to the prompt that was sent to the user. The system may proceed to determine if the request to register the sub-account with the online portal is approved. If the request to register the sub-account with the online portal is approved, then the system may perform an operation that comprises providing the sub-account with access to the online portal so that the sub-account can access the resources provided by the master account. The sub-account's level of access to the resources provided by the master account may be based on rules that are set by the master account that are associated with the first key and the sub-account.

In another embodiment, a method for providing access to a distributed marketing platform is disclosed. The method may incorporate a memory that stores instructions and a processor that executes the instructions to perform at least a portion of the method. The method may include receiving, from a device of a user, a first request to access an online portal associated with a master account. The online portal may be utilized to provide access to resources provided by the master account. Additionally, the method may include receiving, from a device of the master account, a data packet including a master account identifier, a third party identifier, and a key in response to the first request to access the online portal. The master account identifier may uniquely identify the master account and the third party identifier may uniquely identify the user. The method may also include determining if the user has a sub-account with the online portal based on the master account identifier and the third party identifier of the data packet. In one embodiment, the sub-account may identify the user as a local affiliate of a brand of the master account. Then, the method may include transmitting, to the device of the user, a prompt to register the sub-account with the online portal if the user is determined to not have the sub-account with the online portal. The method may include receiving, from the device of the user, a request to register the sub-account with the online portal in response to the prompt. Furthermore, the method may include determining if the key and the request to register the sub-account with the online portal have been approved. Moreover, the method may include providing the sub-account with access to the online portal if the key and the request to register the sub-account with the online portal are determined to be approved. Having access to the online portal may provide the sub-account with access to the resources provided by the master account.

According to another exemplary embodiment, a computer-readable device having instructions for providing access to a distributed marketing platform is provided. The computer instructions, which when loaded and executed by a processor, may cause the processor to perform operations including, but not limited to: receiving, from a device of a user, a request to access an online portal associated with a master account, wherein the online portal provides access to resources provided by the master account; receiving, from a device of the master account, a data packet including a master account identifier, a third party identifier, and a key in response to the request to access the online portal, wherein the master account identifier uniquely identifies the master account, wherein the third party identifier uniquely identifies the user; determining, by utilizing instructions from memory that are executed by a processor, if the user has a sub-account with the online portal based on the master account identifier and the third party identifier of the data packet, wherein the sub-account identifies the user as a local affiliate of a brand of the master account; and providing the sub-account with access to the online portal if the user is determined to have the sub-account, if the key is approved, and if information in a file of the user matches with the master account identifier and the third party identifier of the data packet.

These and other features of the systems and methods for providing access to a distributed marketing platform are described in the following detailed description, drawings, and appended claims.

BRIEF DESCRIPTION OF THE DRAWINGS

FIG. 15 features a web page that is returned when a user selects the option to create a new sub-account from the web page of FIG. 6.

DETAILED DESCRIPTION OF THE INVENTION

Figure 1:
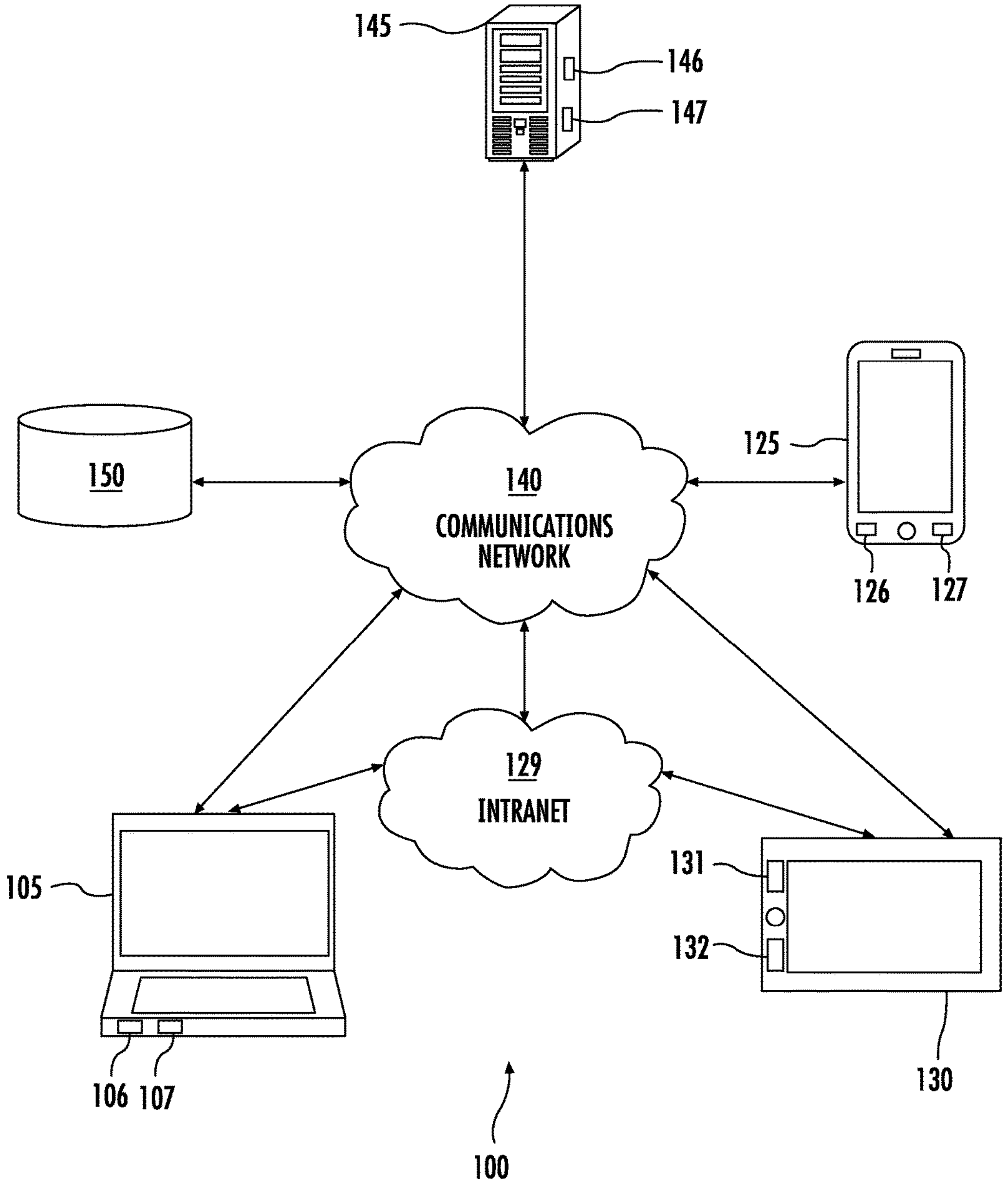
FIG. 1 is a schematic diagram of a system for providing access to a distributed marketing platform according to an embodiment of the present disclosure.

A system 100 and accompanying methods for providing access to a distributed marketing platform are disclosed. The system 100 and methods may enable a local marketer to access the marketing resources, content, and other materials provided by one or more brands (e.g. companies, organizations, etc.) within the same online portal. The online portal of the system 100 may be configured to operate in such a way so as to ensure that agreements between the local marketer and the brands are not violated, and that confidential or proprietary information from one brand is kept separate from another brand. As described herein, a local marketer or affiliate may be associated with a sub-account, and each particular brand may be associated with a master account. The local marketer may promote, sell, offer to sell, or otherwise market various products and services of the brand to customers of the local marketer. In order to assist the local marketer in accessing marketing resources provided by the brand, each brand may register its own master account with the online portal of the system 100 and provide the resources to the online portal so that the resources may be made accessible to authorized sub-accounts. In order to authorize a new sub-account, the master account may generate a unique key, set up rules associated with accessing the marketing resources and/or the master account, and associate the rules with the key and the potential new sub-account. The master account may transmit the key to the potential new sub-account, and a user associated with the sub-account may submit a key to the online portal for processing by the system 100.

Once the key is submitted by the user associated with the potential new sub-account, the system 100 may determine if the submitted key is valid based on whether or not the submitted key matches the key generated by the master account. If the system 100 determines that the submitted key does not match the key generated by the master account, then the sub-account may be prevented by the system 100 from registering with the online portal. As a result, the system 100 may prevent the sub-account from accessing the resources of the master account, and, thus, prevent unauthorized access. However, if the system 100 determines that the submitted key is valid and matches the key generated by the master account, then the system 100 may enable the sub-account to register with the online portal. Once registered, the sub-account may be allowed to access the resources of the master account via the online portal of the system 100. Notably, this process may be repeated for each additional master account that the sub-account wishes to connect with. As the process is repeated for additional master accounts, the sub-account may gain access to the resources for each of the additional master accounts separately within the same online portal of the system 100. Furthermore, when a user of the sub-account logs into the online portal of the system 100, the online portal may present each master account that the sub-account is connected to as a separate "network" on a graphical user interface presented by the system 100. This may ensure that each master account and its associated resources are separately accessible from another master account and its associated resources. Thus, a user of the sub-account may seamlessly access multiple master accounts within the same online portal of the system 100 and experience a similar user experience when accessing the different master accounts.

Referring to the drawings and in particular to FIGS. 1-15, a system 100 for providing access to a distributed marketing platform is schematically illustrated. The system 100 may include any number of components for performing the operative functions disclosed herein. For example, the system 100 may include a master account device 105, a first sub-account device 125, a second sub-account device 130, an intranet 129, a communications network 140, a server 145, and a database 150. The master account device 105 may include a memory 106 that stores instructions and a processor 107 that executes the instructions from memory 106 to perform various operations for the master account device 105. Additionally, the first sub-account device 125 may include a memory 126 and a processor 127, and the second sub-account device 130 may include a memory 131 and a processor 132. The memories and processors of the first and second sub-account devices 125 and 130 may be used for performing various operations for each of the sub-account devices 125 and 130 respectively.

In one embodiment, the master account 105, the first sub-account device 125, and the second sub-account device 130 may be any type of computer device, such as, but not limited to, a computer, a server, a laptop, a mobile device, a tablet, a smartphone, or any other suitable computing device. In one embodiment, the master account device 105, the first sub-account device 125, and the second sub-account device 130 may include displays that that are configured to present various types of media content, web pages, graphical user interfaces associated with the online portal, and anything else. Illustratively, the master account device 105 is shown as a laptop, the first sub-account device 125 is shown as a mobile device, such as a smartphone, and the second sub-account device 130 is shown as a tablet.

The system 100 may perform any of the operative functions disclosed in the present disclosure by utilizing the processing capabilities of server 145 and the storage capacity of the database 150. An online portal of the system 100 may run on the server 145, and files and data associated with the online portal may be stored on the database 150. In one embodiment, the online portal may be a website, a social media application, a mobile application, or other software application, which may be utilized to link master accounts and sub-accounts with each other so that resources of the masters accounts may be accessed by authorized sub-accounts. In one embodiment, the online portal may be made accessible through a social media page. In one embodiment, the server 145 may include one or more memories 146 and one or more processors 147 that may be configured to process any of the various functions of the system 100, such as the functions of the online portal.

The one or more processors 147 may be software, hardware, or a combination of hardware and software. Additionally, the memory 146 of the server 145 can store instructions that the processors 147 may execute to perform various operations of the system 100. For example, the server 145 may assist in processing loads handled by the various devices in the system 100 and any other suitable operations conducted in the system 100, or otherwise. In one embodiment, multiple servers 145 may be utilized to process the functions of the system 100. The server 145 and other devices in the system 100, may utilize the database 150 to store data generated or received by the online portal, marketing resources and information uploaded by master accounts into the online portal, account information for master and sub-accounts, device information, social networking information, or any other information that is associated with the system 100. In one embodiment, multiple databases 150 may be utilized to store data in the system 100.

The intranet 129 of the system 100 may be a network that utilizes internet protocol or other protocols to connect various devices and programs within an organization that is associated with the master account. The intranet 129 may include an internal website, separate portal, or other similar application that is managed and run by the organization associated with the master account. In one embodiment, the internal website of the intranet 129 may include marketing resources and other information associated with the master account and the organization itself. Notably, the intranet 129 may be a private network and may be restricted to users within the organization. In one embodiment, the second sub-account device 130 may be permitted to have access to the intranet 129 by the organization associated with the master account.

Furthermore, the communications network 140 of the system 100 may be utilized to link all the devices in the system 100 to one another such that information and data may be transferred between devices in the system 100. The communications network 140 may include, but is not limited to including, a wireless network, an ethernet network, a satellite network, a broadband network, a cellular network, a private network, a cable network, the Internet, an internet protocol network, any network, or any combination thereof. Notably, the system 100 may utilize a combination of software and hardware to perform the operative functions and services of the system 100 disclosed herein.

Although FIG. 1 illustrates a specific example configuration of the various components of the system 100, the system 100 may include any configuration of the components, which may include using a greater or lesser number of the components. For example, the system 100 is illustratively shown as including a master account device 105, a first sub-account device 125, an intranet 129, a second sub-account device 130, a communications network 140, a server 145, and a database 150. However, the system 100 may include any number of master account devices 105, any number of first sub-account devices 125, any number of intranets 129, any number of second sub-account devices 130, any number of communication networks 140, any number of servers 145, any number of databases 150, or any number of any of the other components in the system 100. Furthermore, in one embodiment, substantial portions of the functionality of the system 100 may be performed by the server 145 without the need for the database 150.

Operatively, the system 100, as shown in FIG. 1, may be configured to provide a sub-account with access to marketing resources provided by a master account through the use of a distributed marketing platform that is provided by an online portal of the system 100. However, before the sub-account is provided with access to a particular master account's resources, the master account may register with the online portal. In one embodiment, the registration of the master account may be performed by having the master account device 105 send a request, along with registration information, to the server 145 via a graphical user interface of the online portal and via the communications network 140. The request and registration information may include parameters such as, but not limited to, an organization name of the organization associated with the master account, an organization address, an organization contact, and other information. Once the request and registration information are received by the server 145, the server 145 can process the request and information by utilizing the processor 147. If the server 145 determines that the request and registration information include the required parameters defined by the online portal, then the server 145 may allow the master account to be created and registered for the organization.

Once the master account is created and registered with the online portal, the server 145 may transmit a prompt via the graphical user interface of the online portal to a user of the master account. In one embodiment, the prompt may indicate that the user of the master account should set a user identification (user ID) and password for the master account. The user of the master account may input a desired user ID and password into the graphical user interface of the online portal via the master account device 105. The server 145 may receive the user ID and password and associate the user ID and password with the master account. In one embodiment, the user ID and password may be utilized by a user of the master account to log into the online portal of the system 100 whenever they desire to access the online portal. The user of the master account may proceed to log into the online portal using the user ID and password, and, once the user ID and password are confirmed to be valid, the user may directly access the online portal.

When the user of the master account logs in and accesses the online portal of the system 100, the user may upload or otherwise transmit information about the organization associated with the master account to the online portal by utilizing the master account device 105. This information may include, but is not limited to, marketing resources, marketing programs, marketing information, organization information, information associated with the user of the master account, and other information. Marketing resources may include, but is not limited to, marketing distribution funds, which may or may not be specific to a particular marketing campaign; marketing templates that may be adjusted by an organization or local marketer; media content, such as video, audio, or other content; social media content; direct mail resources, which may include information related to directly accessing, distributing, and using direct mail promotional materials; and electronic promotional materials, such as electronic-mail promotional materials, digital advertisements, and digital promotional materials. Marketing information may include, but is not limited to, information associated with various products and services provided by the organization; information for local marketers that is associated with how local marketers should market various products and services provided by the organization associated with the master account; information relating to purchasing marketing materials from the organization; information relating to customizing promotional materials; information relating to planning a marketing campaign for a particular product, service, geographic region, and/or demographic; information relating to automated marketing campaigns and programs; information relating to restrictions associated with marketing products and services of the organization; and information relating to the use of marketing distribution funds.

Marketing programs may be specific marketing campaigns developed by the organization for various local marketers to access through the online portal of the system 100. The marketing programs may be streamed or uploaded to the online portal as a file, such as a digital document file, digital video, and/or digital application that may include specific instructions and promotional materials for a local marketer to use in marketing a particular product or service of the organization. Organization information may include, but is not limited to, contact information, information associated with agreements with local marketers, and information identifying local marketers associated with the organization. Information associated with the user of the master account may include a name of the user, an address of the user, personal preferences of the user, personal preferences associated with using the online portal, and other such information.

Once the user of the master account accesses the online portal, the user may access an account management or network management area of the online portal. The account management or network management area may be used by the user of the master account to set preferences associated with the account, and to generate a unique key. In one embodiment, the unique key may be utilized by the master account to allow certain designated local marketers to create a sub-account so as to gain access to the various resources available for the master account through the online portal. In one embodiment, the user of the master account may generate the key himself or may have the online portal generate the key. The key may be a unique combination of digital characters, such as text characters or other types of characters; a unique file, such as an image file, text file, or even a media file; and/or a unique web link or other link. If the user of the master account decides the create the key himself, he can, depending on the type of key he wants to use, type the unique text characters into a field of the online portal, upload a unique media file to the online portal, or upload a unique link to the online portal. However, if the user of the master account wants the online portal to generate the key, the user may select an option on the graphical user interface of the online portal to generate the key. The user may also specify the type of key to the online portal. If the option to generate the key is selected, the server 145 may generate the key at random or may generate a specific type of key that the user of the master account selects.

Once the key is generated, the user of the master account can set certain rules that may be associated with the key. The rules associated with the key may specify how long the key may be used, how often the key may be used, what local marketers are authorized to use the key, what portions of the online portal a particular local marketer may access, what specific resources provided by the master account that a local marketer can access, what the local marketer may do with resources provided by the mater account, what subgroup a sub-account of the local marketer may be automatically associated with, what marketing funds the local marketer may access, what the marketing funds are based on (e.g. credit/percent/credit with percent abated), when the local marketer can access funds or features of the online portal, and any other rule associated with accessing anything provided by the organization associated with the master account. Once the key and its associated rules are set, the user of the master account may transmit the key, along with instructions for using the key and a link to the online portal, to a selected local marketer, such as a local marketer associated with first sub-account device 125, a local marketer associated with second sub-account device 130, or both. The key may be transmitted to the selected local marketer using the master account device 105, the server 145, or both. In certain embodiments, the key may be transmitted to the selected local marketer via email, via text message, via a peer-to-peer connection, or through any other electronic distribution means.

In one sample scenario, assume the local marketer associated with the first sub-account device 125 was the local marketer that was sent the key. The local marketer that is associated with the first sub-account device 125 may view or otherwise access the key, and access either a generic landing page for the online portal or a custom landing page associated with the organization that is associated with the master account. Once the local marketer accesses the landing page presented by the online portal, the local marketer may enter the key in a field on the landing page, along with account registration information for creating a sub-account with the online portal. In one embodiment, the local marketer may be prompted by the online portal to enter the account registration information associated with the sub-account only after the key has been determined to be valid. The account registration information may include information identifying the local marketer, information identifying users associated with the local marketer, a user ID for the sub-account, a password for the sub-account, or any other information associated with the local marketer. The server 145 may analyze the key entered by the local marketer to determine if the key entered by the local marketer matches the key generated on behalf of the master account. If the key entered by the local marketer does not march the key generated for the master account, then the server 145 may transmit a notification to the first sub-account device 125 indicating that the key submitted by the local marketer is invalid, that access to the online portal is denied, and that the sub-account will not be created.

However, if the server 145 determines that the key entered by the local marketer does match the key generated for the master account, then the server 145 may proceed to determine if the key entered by the local marketer and the registration information need further approval from the organization associated with the master account. If the server 145 determines that the key entered by the local marketer and the registration information does not need further approval from the organization associated with the master account, then the server 145 may proceed to process the rules associated with the key and process the registration information for creating the sub-account for the local marketer. Once the rules associated with the key and the registration information are processed, the server 145 may create the sub-account for the local marketer subject to the rules associated with the key. The server 145 may then proceed to transmit a notification to the first sub-account device 125 via the online portal to indicate to the local marketer that the sub-account has been created and that the key has been approved.

However, if the server 145 determines that the key entered by the local marketer and the registration information does need further approval from the organization associated with the master account, then the server 145 may proceed to place the pending sub-account in an approval queue and transmit a notification through the online portal to the master account. The notification may indicate that organization associated with the master account must approve the sub-account before they sub-account may officially register with the online portal and gain access to the resources of the master account. By placing the pending sub-account in the approval queue, it may serve to ensure that only users that are intended, by the organization associated with the master account, to have access to the online portal are actually given access to the online portal. If the organization associated with the master account disapproves of the sub-account registration, then the server 145 may transmit a notification to the first sub-account device 125 indicating that the sub-account registration has been rejected. However, if the organization associated with the master account approves of the sub-account registration, then the server 145 may transmit a notification to the first sub-account device 125 indicating that the sub-account registration has been approved.

If the sub-account has been approved by the organization, the server 145 may proceed to process the rules associated with the key and process the registration information for creating the sub-account for the local marketer. The server 145 may then create the sub-account for the local marketer subject to the rules associated with the key. The server 145 may then transmit a notification to the first sub-account device 125 via the online portal to indicate that the sub-account has been created and that the key has been approved. A user of the first sub-account device can then log into the online portal using a user ID and password combination, and access approved resources of the master account. In one embodiment, the rules may specify a particular sub-group of the master account that the sub-account should be affiliated with. The sub-group may specify sub-accounts based on what marketing distribution funds the sub-account can use, what marketing resources the sub-account can access, along with other restrictions placed by the rules associated with the sub-group. The local marketer can continue to access, via the online portal, the resources provided by the master account until the organization associated with the master account indicates otherwise. In one embodiment, as shown in the webpage 200 of FIG. 2, the user of the sub-account may view each master account that they are currently linked to and view potential new master accounts that they could potentially link to, such as via the graphical user interface of the online portal. The potential new master accounts may be displayed to the user of the sub-account based on the local marketer's industry, the local marketer's activity with the online portal, or other factors.

In another sample scenario, assume the local marketer associated with the second sub-account device 130 is seeking to access the resources associated with the master account. In this scenario, a user of the second sub-account device 130 may be a previously existing user on the organization's intranet 129, and may be provided with an action to log onto the online portal. The action to log onto the online portal may be included in a link provided through a separate portal within the intranet 129 of the organization associated with the master account. When the user of the second sub-account device 130 clicks on the link, a data packet (e.g. extensible markup language (XML) packet or other suitable packet) may be sent by the separate portal within the intranet 129 of the organization over a secure connection to the online portal of the system 100. In one embodiment, the data packet may be sent by utilizing a single sign-on application programming interface provided by system 100 that allows the separate portal within the intranet 129 to communicate with the online portal of the system 100. In one embodiment, the data packet may include a master account identifier, a third party identifier, a key associated with accessing the master account, information associated with the user, information associated with the organization, and/or other information. The master account identifier may be an identifier that uniquely identifies the master account that is registered with the online portal of the system 100, and the third party identifier may be an identifier that is unique to the organization and specifically identifies the user of the second sub-account device 130. In one embodiment, the data packet may not include a user ID or password from the user of the second sub-account device 130.

Once the online portal of the system 100 receives the data packet, the server 145 may analyze the data packet, and, based on the identifiers in the data packet, may determine if the user of the second sub-account device 130 is a previously existing user of the online portal of the system 100 that has a sub-account. If the server 145 determines that a sub-account does not exist for the user of the second sub-account device 130, then the server 145 may execute instructions to cause the online portal of the system 100 to display a registration screen to the user of the second sub-account device 130 to create the sub-account. In one embodiment, the server 145 may pre-populate the registration screen with information that was sent in the data packet to the online portal of the system 100. The user of the second sub-account 130 may view the registration screen, adjust any information if necessary, select a user ID and password for the sub-account, and submit the information in the registration screen to the online portal using the second sub-account device 130.

Once the information is submitted to the online portal, the server 145 may associate the rules associated with the key with the sub-account and enforce the rules on the user of the second sub-account device 130 when he or she accesses the resources of the master account or accesses the online portal. Additionally, the server 145 may store or otherwise set a file on an application of the user of the second sub-account device that may include at least the master account identifier, the third party identifier, an identifier for the new sub-account, along with account information associated with the sub-account. For example, the file may be an internet cookie that is stored in connection with a browser that the user is using to access the online portal of the system 100.

Figure 2:
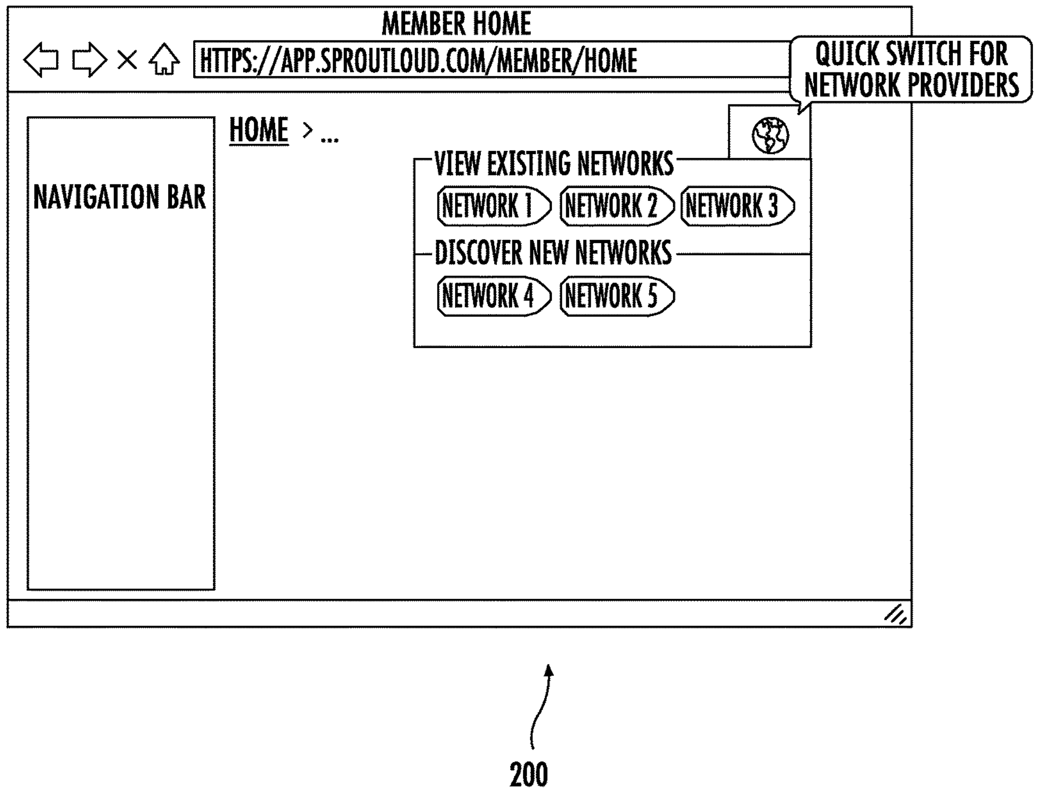
FIG. 2 features a web page of an online portal that displays existing master account networks and potential new networks to a user of a sub-account of the system of FIG. 1.

If, however, the server 145 determines that the sub-account does actually exist for the user of the second sub-account device after analyzing the data packet, the server 145 may compare the information from the data packet with a cookie (or other similar file) that was previously stored in connection with the user of the second sub-account device 130. If the cookie is found and the information from the data packet matches the information in the previously stored cookie, the server 145 may log the user of the second sub-account device 130 automatically into the online portal and the user may be given access to the master account's resources. If, however, the cookie is not found, the cookie has been deleted, or the cookie is found and information in the cookie does not match the information in the data packet, the server 145 may prompt the user of the second sub-account device 130 for his or her user credentials for logging into the sub-account. The user of the second sub-account device 130 may then proceed to enter in his or her user ID and password for the online portal and access the resources of the master account. In one embodiment, the user of the second sub-account device 130 may enter the user ID and password for the online portal on a generic login page of the online portal, a custom landing page provided by the master account, and/or through a single sign-on provided by the intranet 129. When the user of the second sub-account device 130 successfully logs into the online portal, the user may be presented with a web page as shown in FIG. 2, which can display each master account that the user is currently linked to and view potential new master accounts that the user could potentially link to. As described herein, the potential new master accounts may be displayed to the user of the sub-account based on the local marketer's industry, the local marketer's activity with the online portal, or other desired factors.

In one embodiment, the system 100 may allow a user to select an account to log into based on information entered into the online portal. For example, as shown in web page

Figure 3:
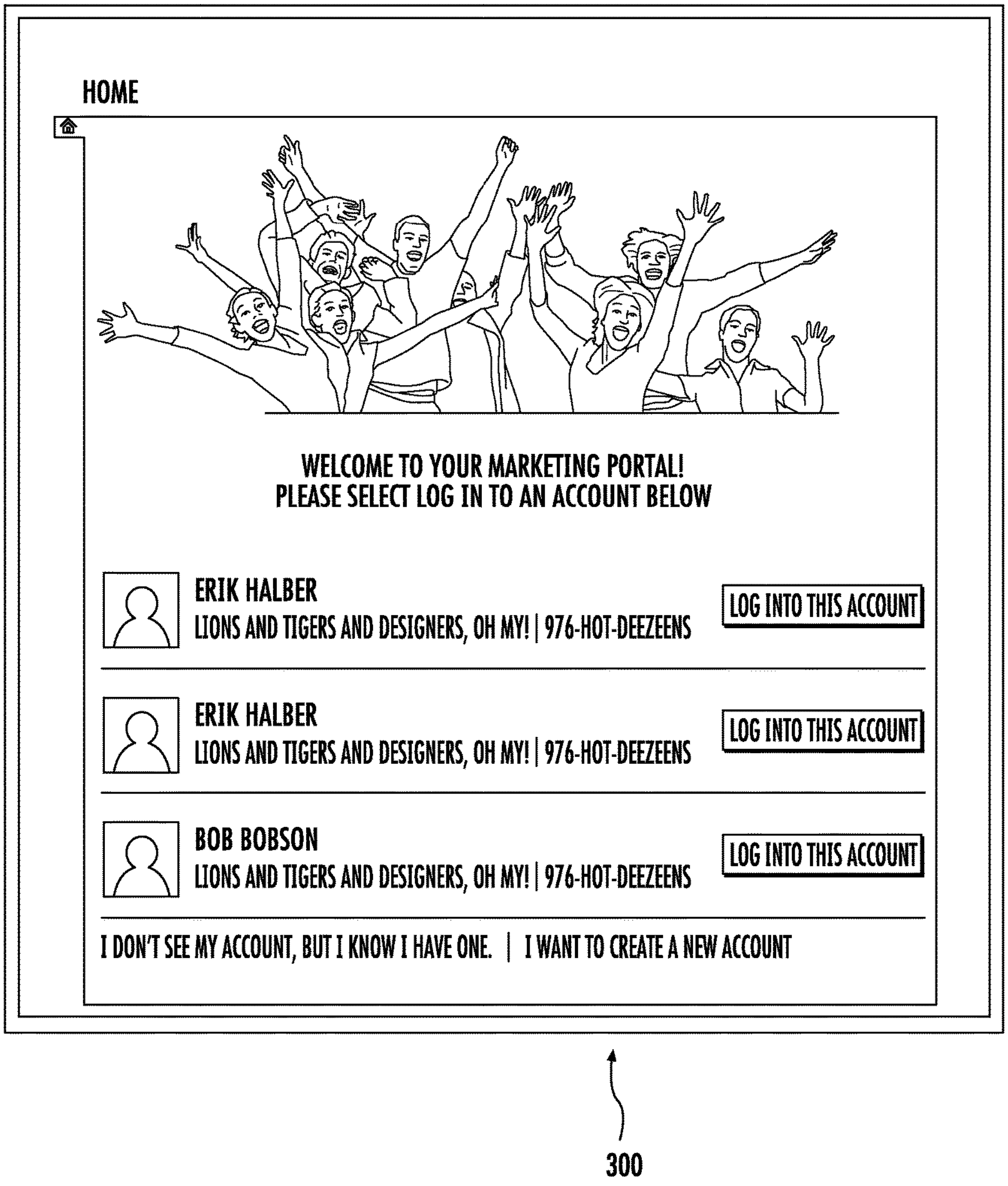
FIG. 3 features a web page illustrating a login page for logging into a sub-account of the system of FIG. 1.
Figure 4:
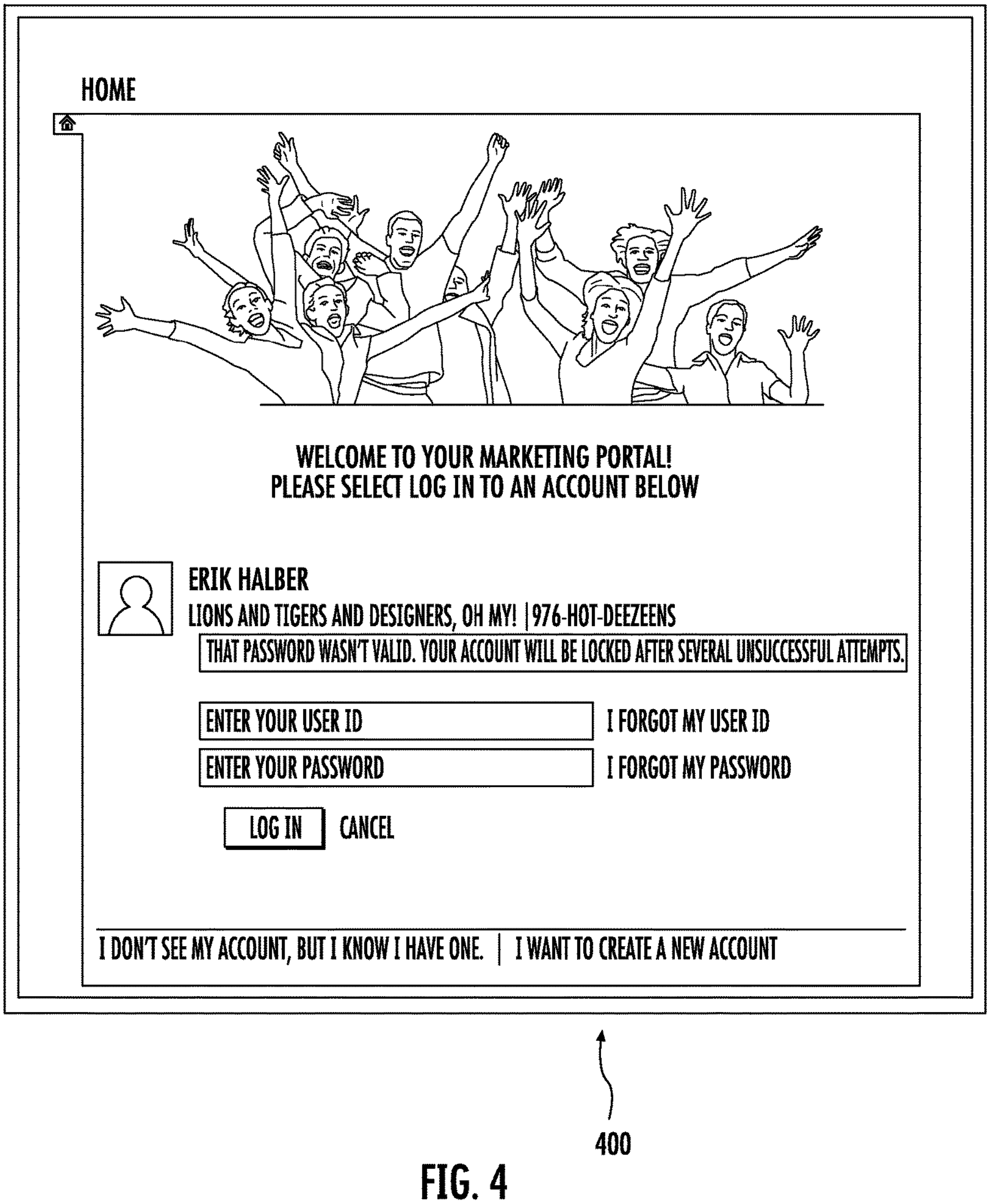
FIG. 4 features a web page illustrating a failed login attempt when a user inputs invalid information into the web page of FIG. 3.
Figure 5:
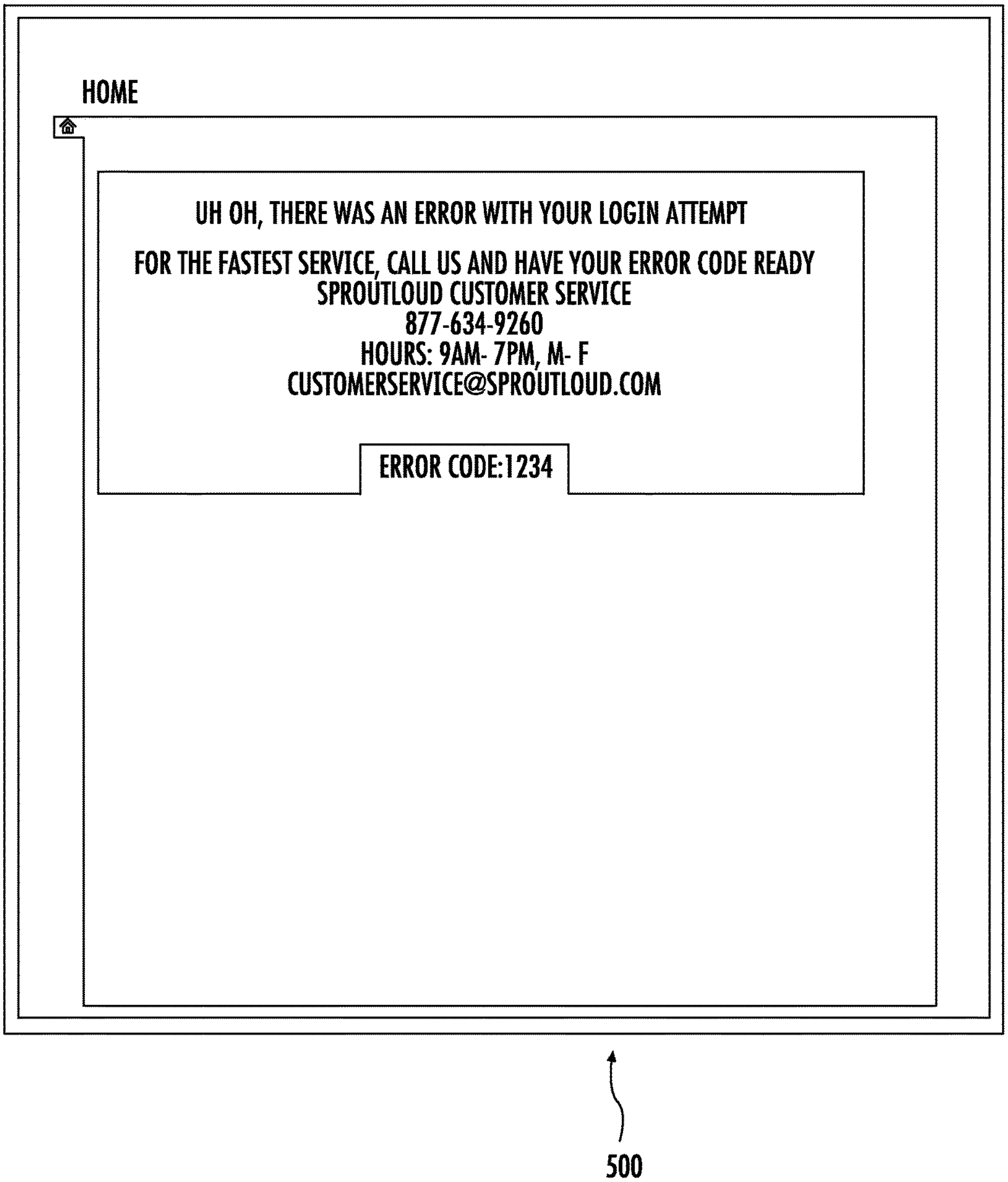
FIG. 5 features a web page illustrating an error that occurs when an unauthorized user inputs information into the web page of FIG. 3.

300 of FIG. 3, the user of first sub-account device 125 or second sub-account device 130 may have entered in information into the online portal and been provided with a list of accounts to log into so as to access resources for a given master account. The user may then proceed to input his or her login credentials and proceed accordingly. If the user does not input proper login credentials, then the online portal may display a page as shown in the web page 400 of FIG. 4, which states that the login credentials were invalid. If there is an error with a login attempt, such as the detection of an unauthorized user, a web page 500 as shown in FIG. 5 may be displayed to the user, which may indicate that an error occurred with the login attempt.

Figure 6:
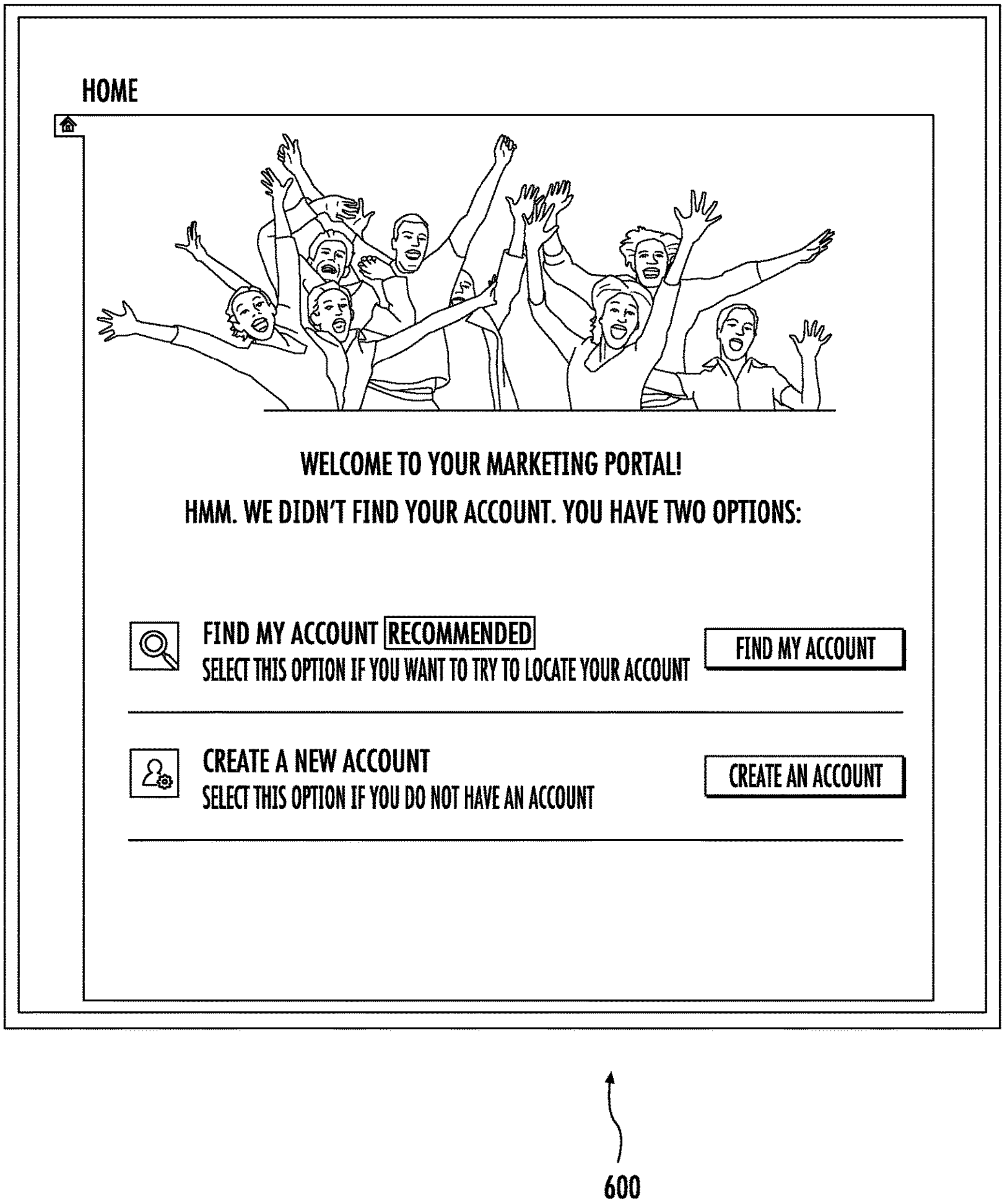
FIG. 6 features a web page that enables a user of the system of FIG. 1 to find a previously made account or to create a new account for the online portal of the system.
Figure 7:
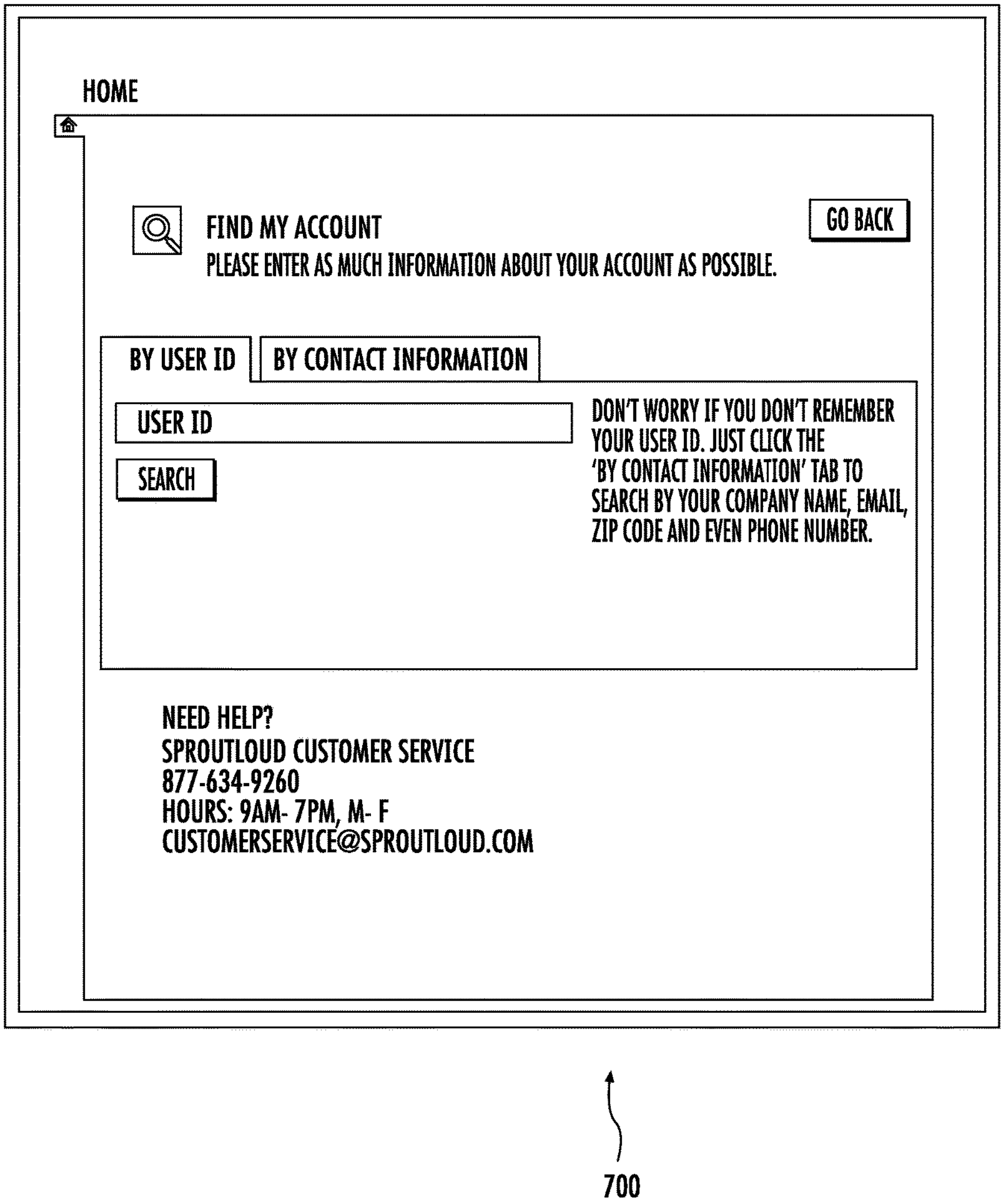
FIG. 7 features a web page that is returned when a user selects the option to find a previously made account from the web page of FIG. 6, wherein the web page enables the user to search for the previously made account based on a user identification associated with a sub-account.
Figure 8:
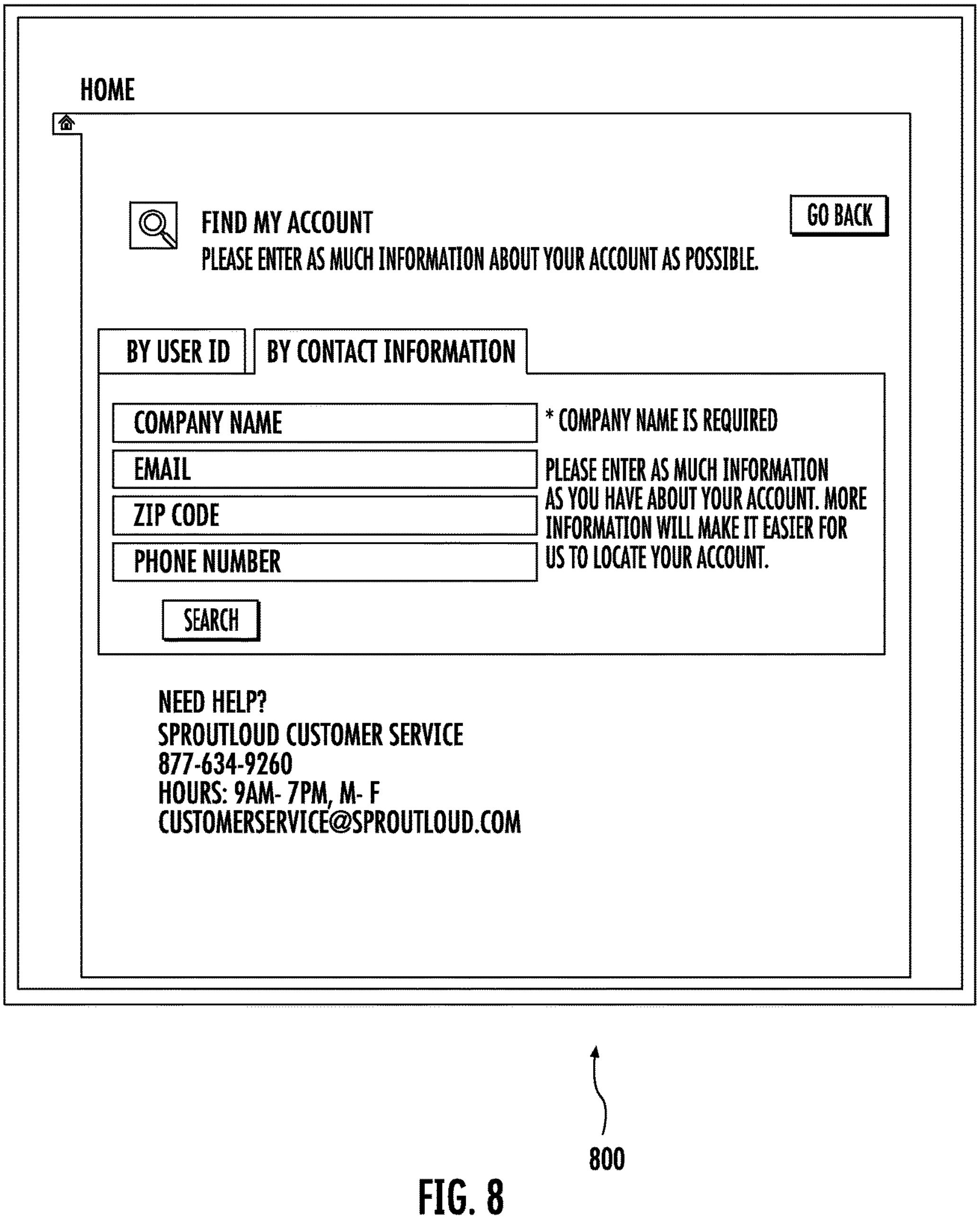
FIG. 8 features a web page that is returned when a user selects the option to find a previously made account from the web page of FIG. 6, wherein the web page enables the user to search of the previously made account based on contact information associated with a sub-account.

In one embodiment, the system 100, as shown the web page 600 in FIG. 6, may provide a user with the option to find a previously existing sub-account or the option to create a new sub-account. If the user selects the option to find a previously existing sub-account, the user may be presented with a web page as shown in the web pages 700 and 800 of FIGS. 7 and 8. If the user selects an option to search for an account based on user ID, then the online portal may present the web page as shown in FIG. 7. The user may enter in a user ID and the online portal may display search results associated with the entered user ID. If, however, the user selects an option to search for an account based on contact information for the user or other contact information, the online portal may present the web page as shown in FIG. 8. The user may enter in contact information, such as, but not limited to, a company name, an email address, a zip code, a phone number, or other similar information, and the online portal may display search results based on such information.

Figure 9:
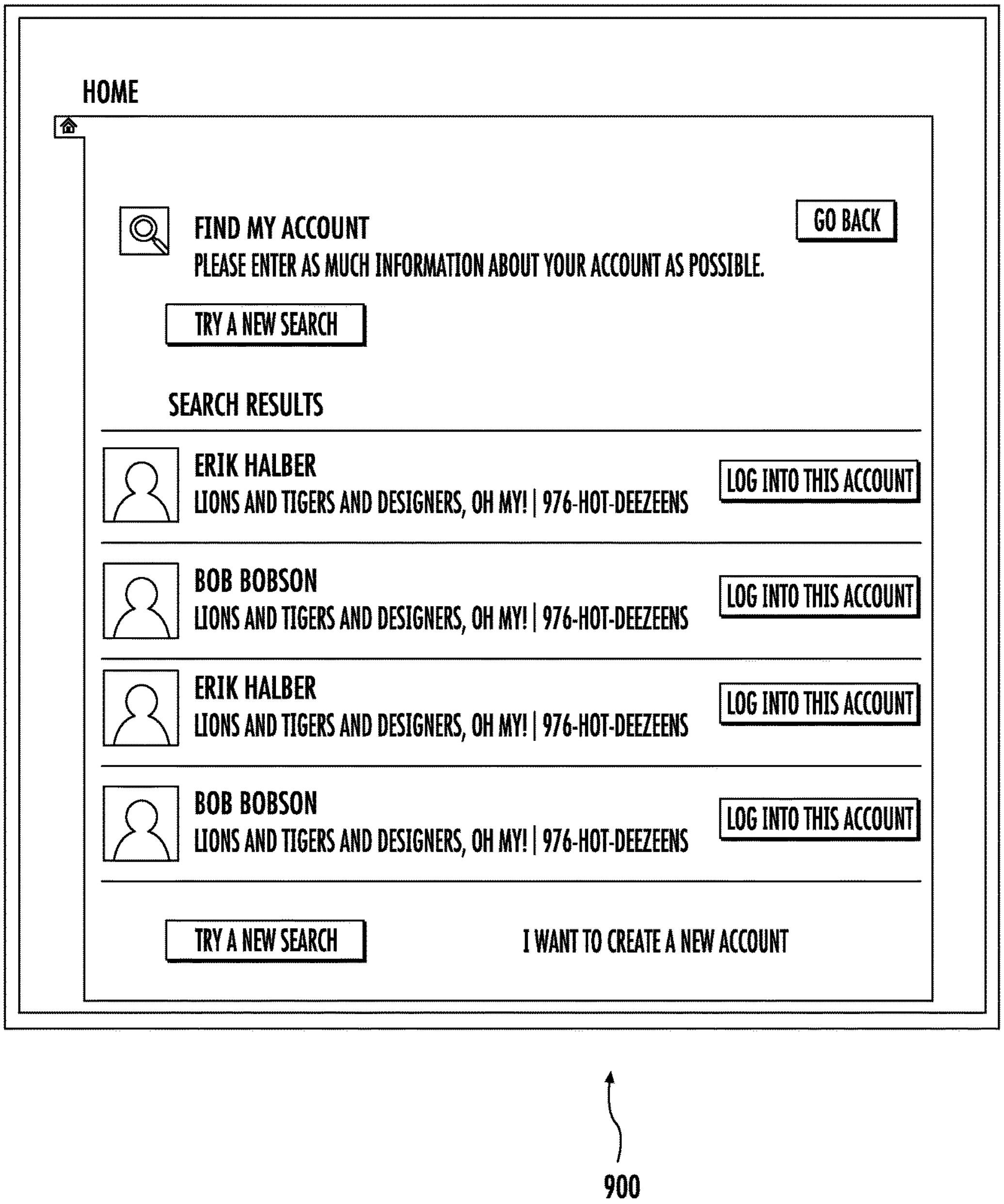
FIG. 9 features a web page that is returned that display possible results when a user inputs contact information associated with a sub-account into the web page of FIG. 8.
Figure 10:
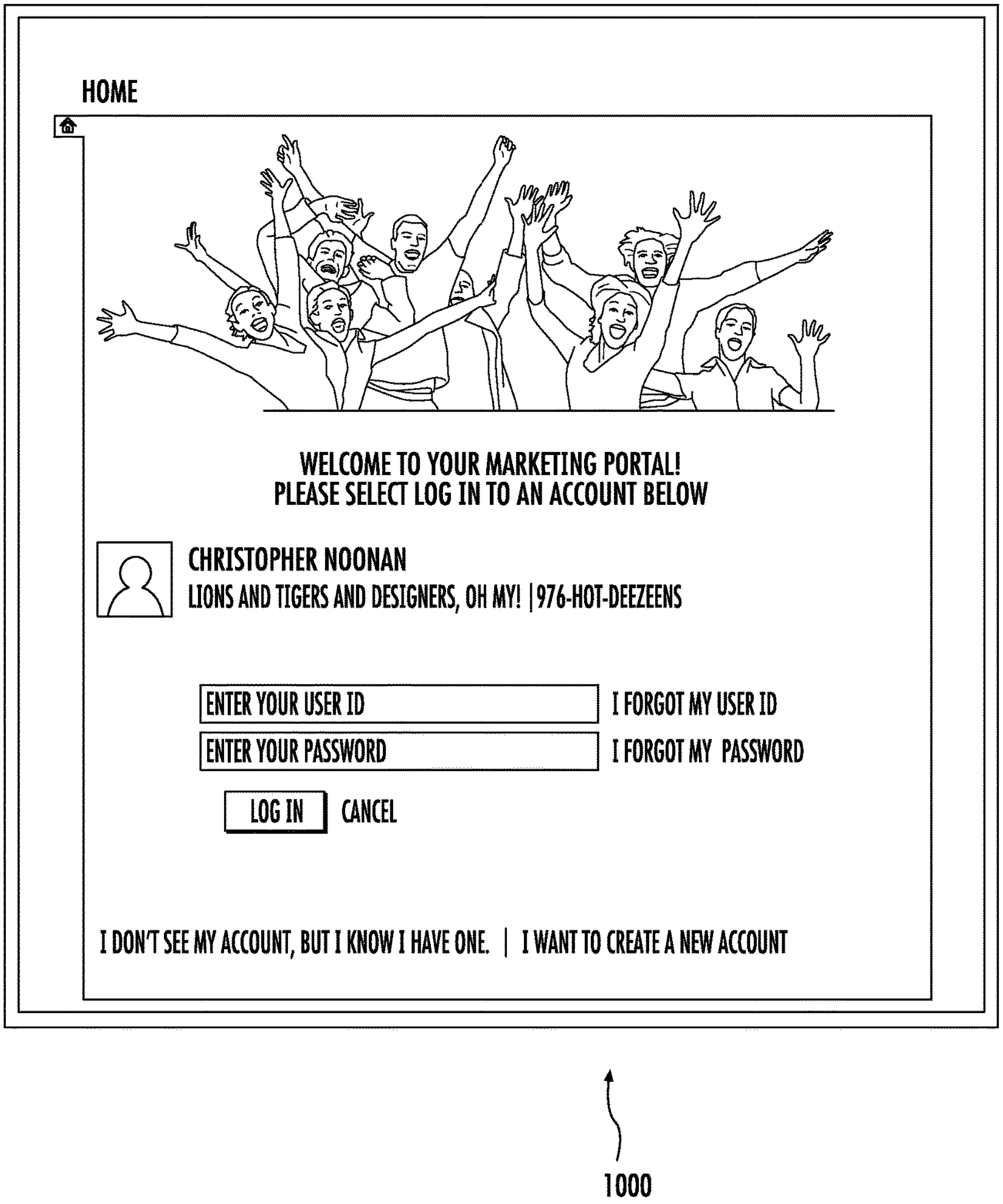
FIG. 10 features a web page that is returned that prompts a user to log into the online portal when a sub-account is found in the online portal for a user.
Figure 11:
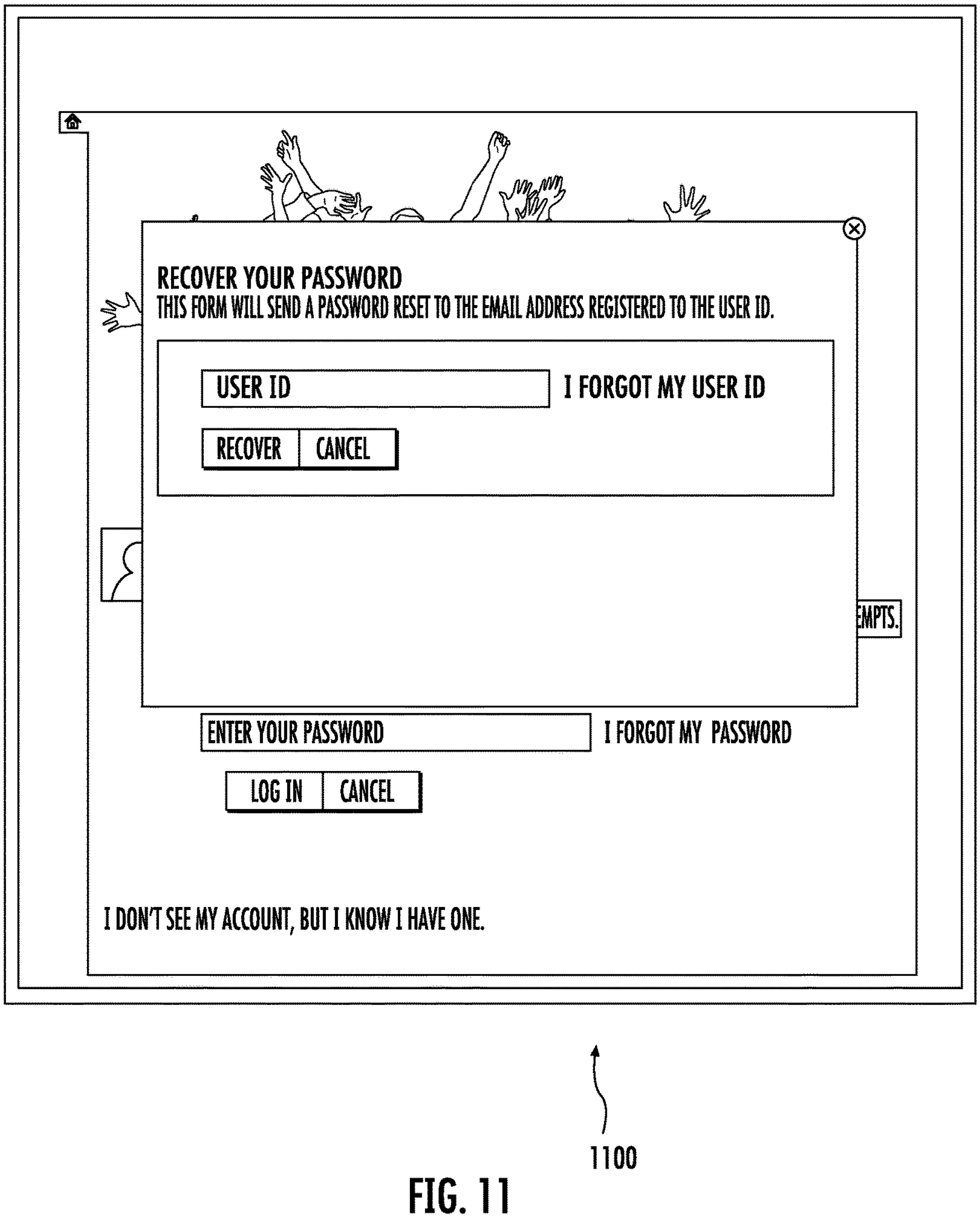
FIG. 11 features a web page that is returned when a user attempts to recover a password associated with a sub-account by clicking on a link in the web page of FIG. 10.
Figure 12:
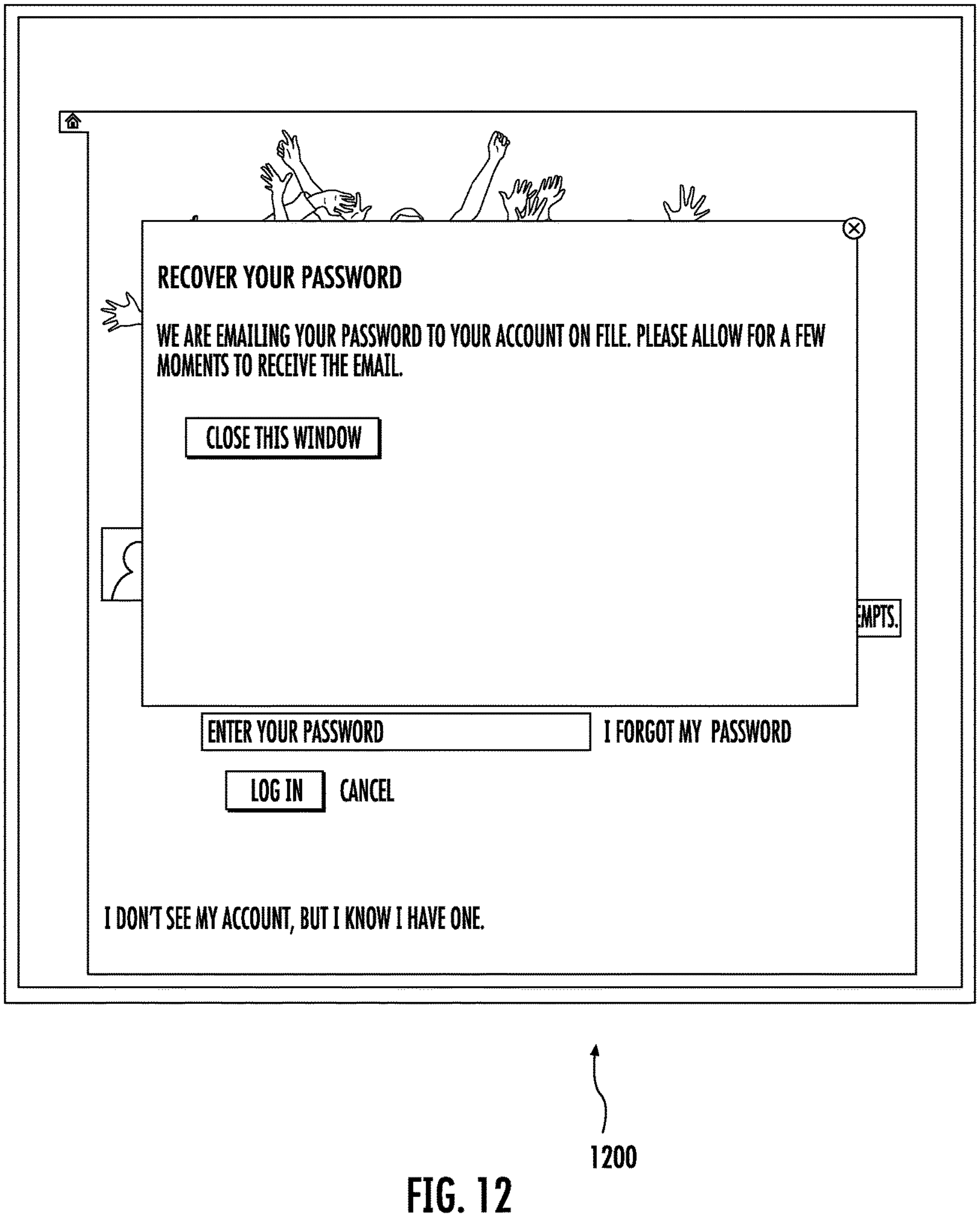
FIG. 12 features a web page that is returned when a user inputs information to recover the password into the web page of FIG. 11.

The web page 900 of FIG. 9 illustrates sample search results presented by the online portal based on a search for a previously existing account. The user may be given the option to log into accounts provided in the search results. If the user selects the option to log into an account from the search results, the user may be presented with web page 1000, as shown in FIG. 10, where the user may enter in the user's user ID and password. If the user forgot his password, the user may click a link on the web page 1000 to recover his password. Once the user clicks on the link on the web page 1000 to recover his password, the user may be presented with a web page 1100, as shown in FIG. 11, to enter in his user ID for the sub-account to recover the password. Once the user enters his user ID, a web page 1200, as shown in FIG. 12, may be presented, which states that an e-mail or other notification was sent including the requested password.

Figure 13:
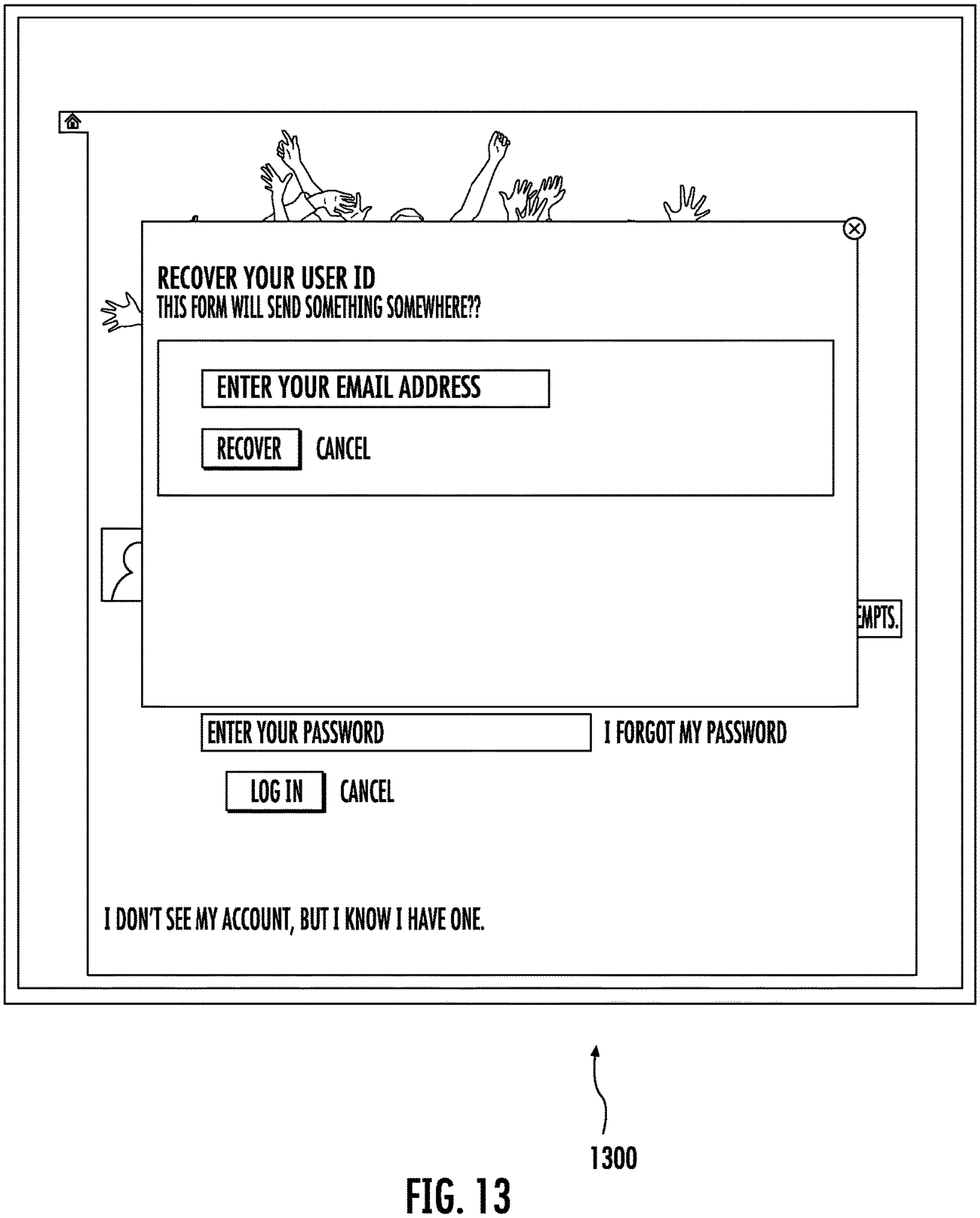
FIG. 13 features a web page that is returned when a user inputs information to recover his or her user identification into the web page of FIG. 10.
Figure 14:
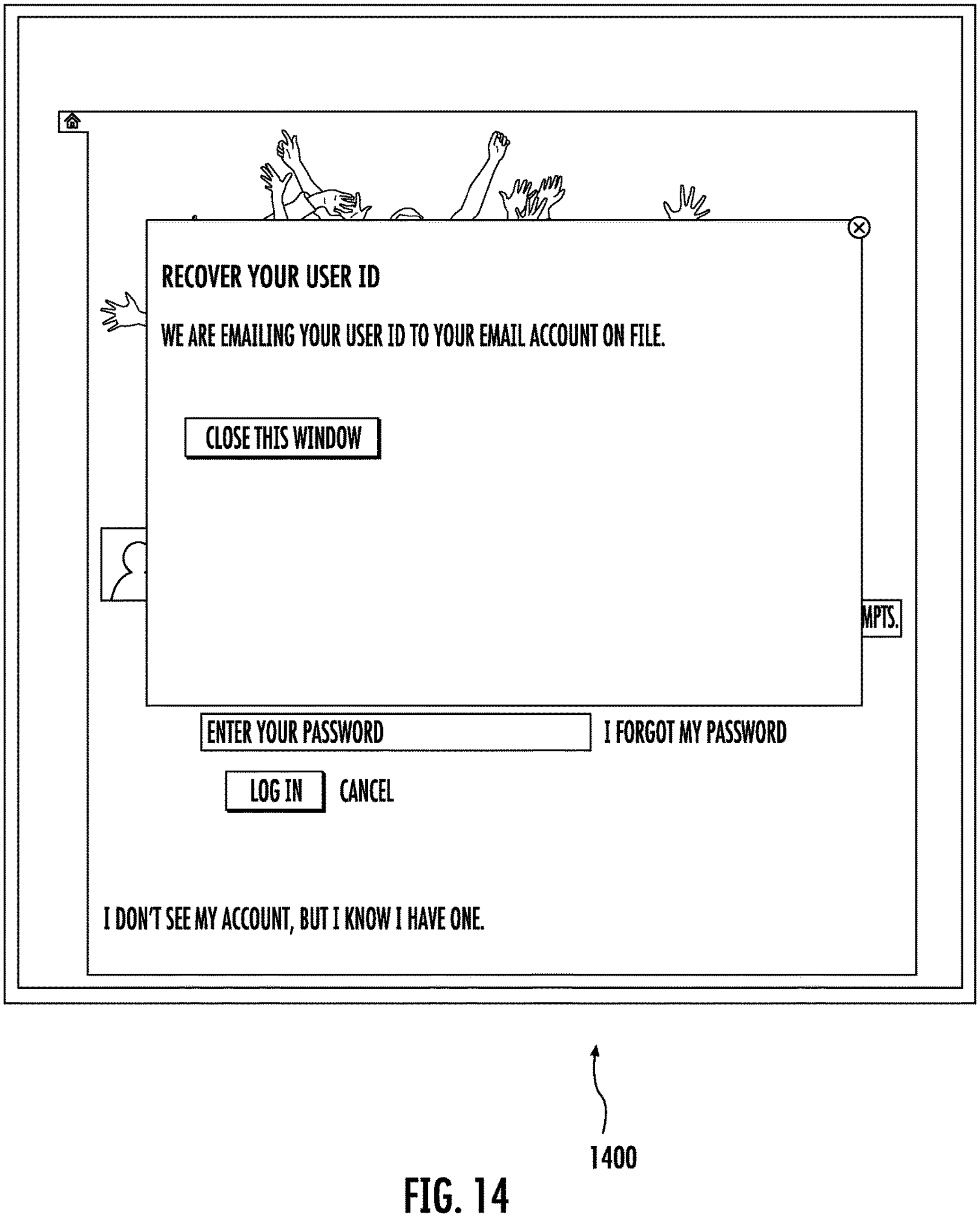
FIG. 14 features a web page that is returned when a user inputs information to recover the user identification into the web page of FIG. 13.

If the user forgot his user ID, the user may click a link on the web page 1000 to recover his user ID. Once the user clicks on the link on the web page 1000 to recover his user ID, the user may be presented with a web page 1300, as shown in FIG. 13, to enter in his email address for the sub-account to recover the user ID. Once the user enters his email address, a web page 1400, as shown in FIG. 14, may be presented, which states that an e-mail or other notification was sent including the requested user ID. If the user does not have a pre-existing sub-account, the user may be presented with web page 1500, as shown in FIG. 15, which may allow the user to enter in information for registering a sub-account with the online portal of the system 100.

In another embodiment, the system 100 may also include providing the ability to search the marketing resources of the master account based on a specified keyword. The system 100 may use the keyword to search the selected master account for content and information associated with the keyword, and retrieve the content and/or information that match the keyword or are related to the keyword. If the system 100 retrieves content, the system 100 may send instructions to a device of the local marketer that cause the device to display the content and/or information. In one embodiment, the system 100 may be utilized to determine statistics associated with the marketing resources, the master accounts, and the sub-accounts. For example, the system 100 may determine statistics that reveal the most effective local marketers, the least effective local marketers, the local marketers that need the most resources, the local marketers that need fewer resources, which marketing materials are most often used, which marketing materials are rarely used, which marketing materials are the most effective, and which marketing materials are least effective. Such information may be determined by the server 145 based on accesses made by the devices in the system 100 to the online portal.

Figure 16:
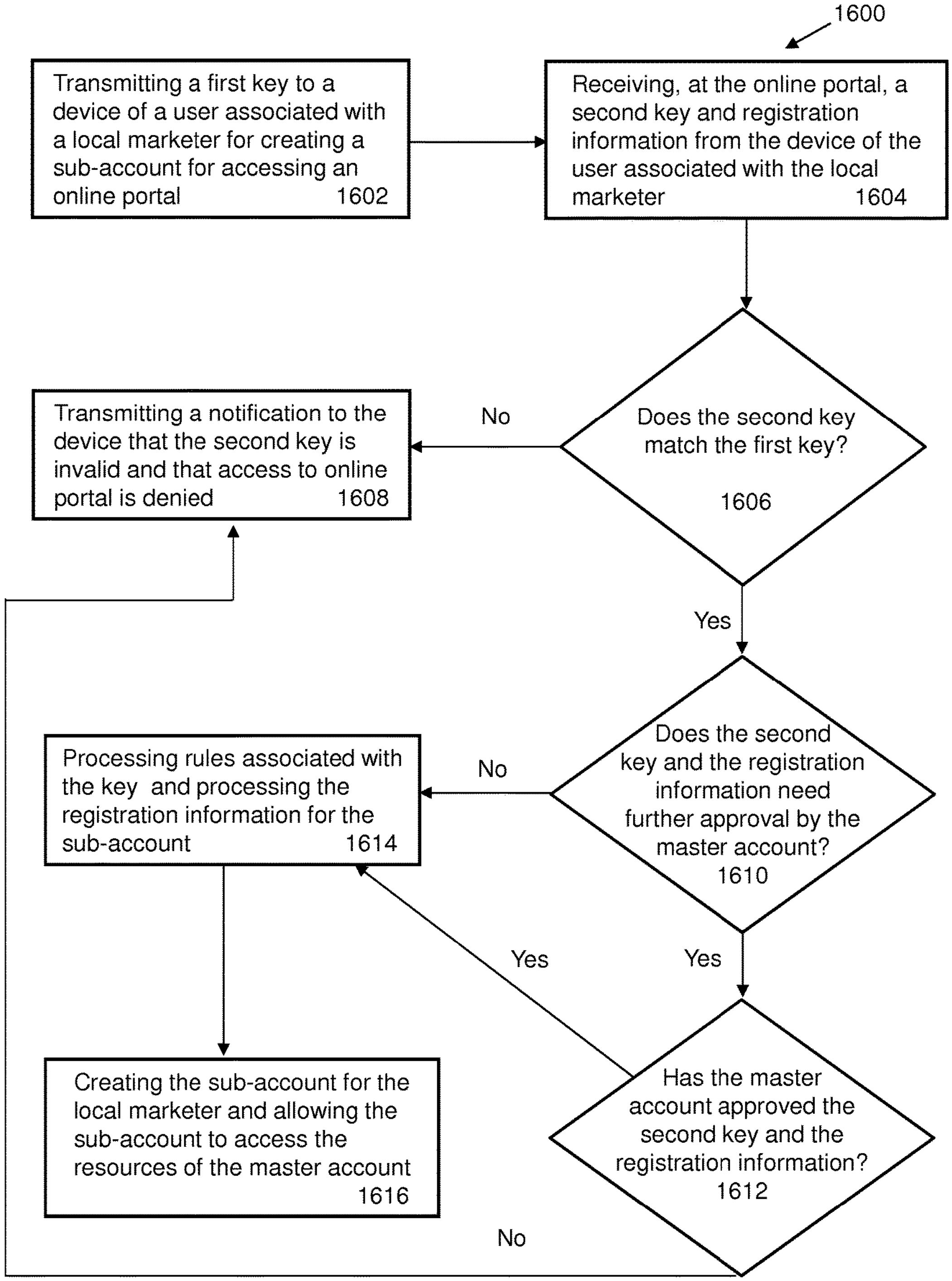
FIG. 16 is a flow diagram illustrating a sample method for providing access to a distributed marketing platform according to an embodiment of the present disclosure.

As shown in FIG. 16, an exemplary method 1600 for providing access to a distributed marketing platform is schematically illustrated. The method 1600 may include, at step 1602, transmitting a first key to a device of a user associated with a local marketer for creating a sub-account for accessing the online portal of the system 100. In one embodiment, the key may be provided to the device of the user via e-mail or other communications means. In one embodiment, the key may be transmitted with the assistance of the server 145, database 150, the master account device 105, any combination thereof, or any other appropriate device. At step 1604, the method 1600 may include receiving, at the online portal, a second key, along with registration information from the device of the user associated with the local marketer. In one embodiment, only the second key may be sent at this stage of the method 1600. In one embodiment, the second key and registration information may be sent by the first sub-account device 125, the second sub-account device 130, or other appropriate device.

At step 1606, the method 1600 may include determining if the second key matches the first key. In one embodiment, the server 145 may perform the determination with or without the assistance of other devices in the system 100. If the second key is determined not to match the first key, then the method 1600 may include transmitting a notification to the device of the user indicating that the key is invalid and that access to the online portal is denied at step 1608. If, however, the second key is determined to match the first key, then the method 1600, at step 1610, may include determining if the second key and registration information need further approval by the organization associated with the master account. If the second key and registration information need further approval, then the method 1600, at step 1612, may include determining if the organization has approved the second key and the registration information. This determination may be performed by having the server 145 analyze the master account to determine if a user associated with the master account submitted information into the online portal that indicates that the second key and/or registration information has been approved.

If the server's 145 analysis indicates that the master account approved the second key and registration information, the method 1600 may proceed to step 1614, which involves having the server 145 process the rules associated with the key and process the registration information for the sub-account. At step 1616, the method 1600 may include creating the sub-account for the local marketer and allowing the sub-account to access the resources of the master account. If the server 145's analysis indicates that the master account has not approved the second key and registration information, the method 1600 may proceed to step 1608. If, however, the second key and the registration information do not need approval by the organization associated with the master account, the method 1600 may proceed directly to step 1614 from step 1610. Notably, method 1600 may incorporate any of the functionality described herein for the systems and methods presented herein.

Figure 17:
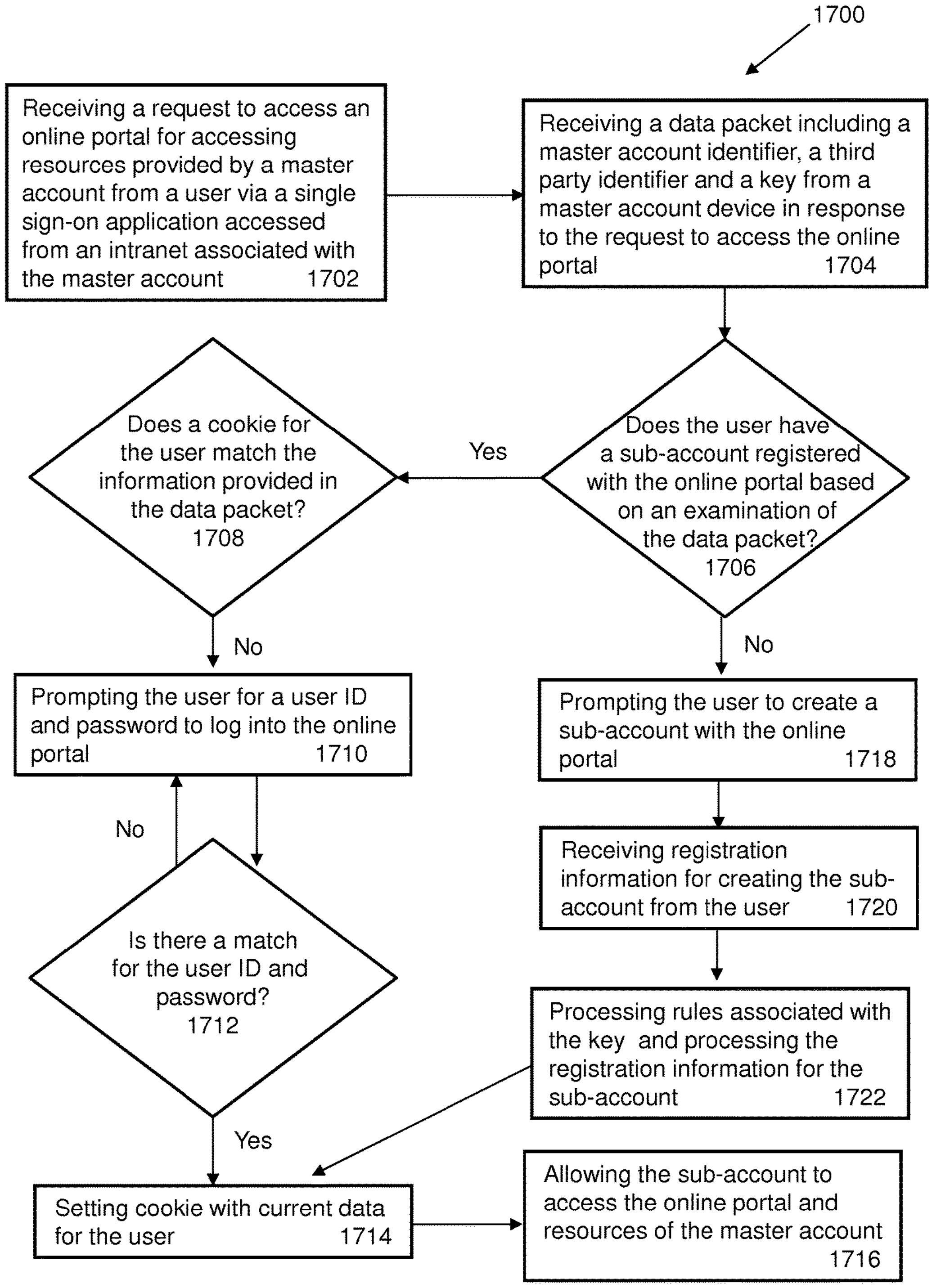
FIG. 17 is a flow diagram illustrating a sample method for providing access to a distributed marketing platform using a single sign-on application programming interface according to an embodiment of the present disclosure.

As shown in FIG. 17, an exemplary method 1700 for providing access to a distributed marketing platform is schematically illustrated. The method 1700 may include, at step 1702, receiving a request to access the online portal so as to access resources provided by a master account from a user. In one embodiment, the request may be received via a single sign-on application accessed from the intranet 129 associated with the master account. The request may be received by first sub-account device 125, second sub-account device 130, or another appropriate device. At step 1704, the method 700 may include receiving a data packet in response to the request to access the online portal. The data packet may be received from a separate portal within the intranet 129 of the master account via the master account device 105. In one embodiment, the data packet may include a master account identifier, a third party identifier and a key from a master account device, such as master account device 105. At step 1706, the method 1700 may include determining if the user has a sub-account registered with the online portal based on an examination of the data packet. The server 145, database 150, any combination thereof, or any other appropriate device may perform this operation.

If the examination of the data packet indicates that the user does have a sub-account registered with the online portal, the method 1700, at step 1708, may include determining if a cookie (or other similar file) for the user matches the information provided in the data packet. The server 145, database 150, any combination thereof, or any other appropriate device may perform this operation. If the cookie is found and the information matches the information in the packet, the user may be allowed to access the online portal automatically. If the cookie is not found or the information in the cookie does not match the information from the data packet, the method 1700, at step 1710, may include prompting the user for a user ID and password to log into the online portal. The prompt may be sent by the server 145. At step 1712, the method 1700 may include receiving the login credentials for the user and determining if there is a match in the system 100 for the user ID and password provided. If the server 145 determines that there is no match for the login credentials, the method 1700 may include repeating step 1710. If the server 145 determines that there is a match for the login credentials, the method 1700 may include, at step 1714, setting a cookie (or other similar file) with the current data for the user. The cookie may include the master account identifier, the third party identifier, and a sub-account identifier associated with the online portal. The cookie may be set by the server 145, or other appropriate device, and stored in the database 150 or on another appropriate device. At step 1716, the method 1700 may include allowing the sub-account to access the online portal and the resources of the master account subject to the rules associated with the key.

If, at step 1706, the examination of the data packet indicates that the user does not have a sub-account registered with the online portal, the method 1700, at step 1708, may include prompting the user to a create a sub-account with the online portal. The server 145, or other appropriate device, may provide the prompt via the online portal. At step 1720, the method 1700 may include receiving registration information for creating the sub-account from the user. This information may be transmitted from the first sub-account device 125, the second sub-account device 130, or other appropriate device. At step 1722, the method 1700 may include processing the rules associated with the key and processing the registration information for the sub-account. The processing may be performed by the server 145 or other appropriate device. Once the processing is complete, the method 1700 may proceed to steps 1714 and 1716 respectively so that the user of the new sub-account may access the online portal and the resources of the master account. Notably, method 1700 may incorporate any of the functionality described herein for the systems and methods presented herein.

As disclosed herein, the system 100 and methods allow local marketers to "network" with one or more brands (i.e. master accounts) to gain access to the marketing resources and programs that the local marketer needs to access to effectively promote and sell the brands' products and services to consumers. In one embodiment and as described herein, when a user of the sub-account logs into the online portal, the online portal may present each master account that the sub-account is connected to as a separate "network" on a graphical user interface of the online portal so as to ensure that a given master account is separately accessible from another master account. As a result, a user of the sub-account may access multiple master accounts within the same online portal and experience similar user experiences when accessing the different master accounts that the sub-account is connected to. In one embodiment, each sub-account may inherit the module access of each master account that it is linked with, as well as the marketing programs and marketing materials of each master account that has given the sub-account access.

Figure 18:
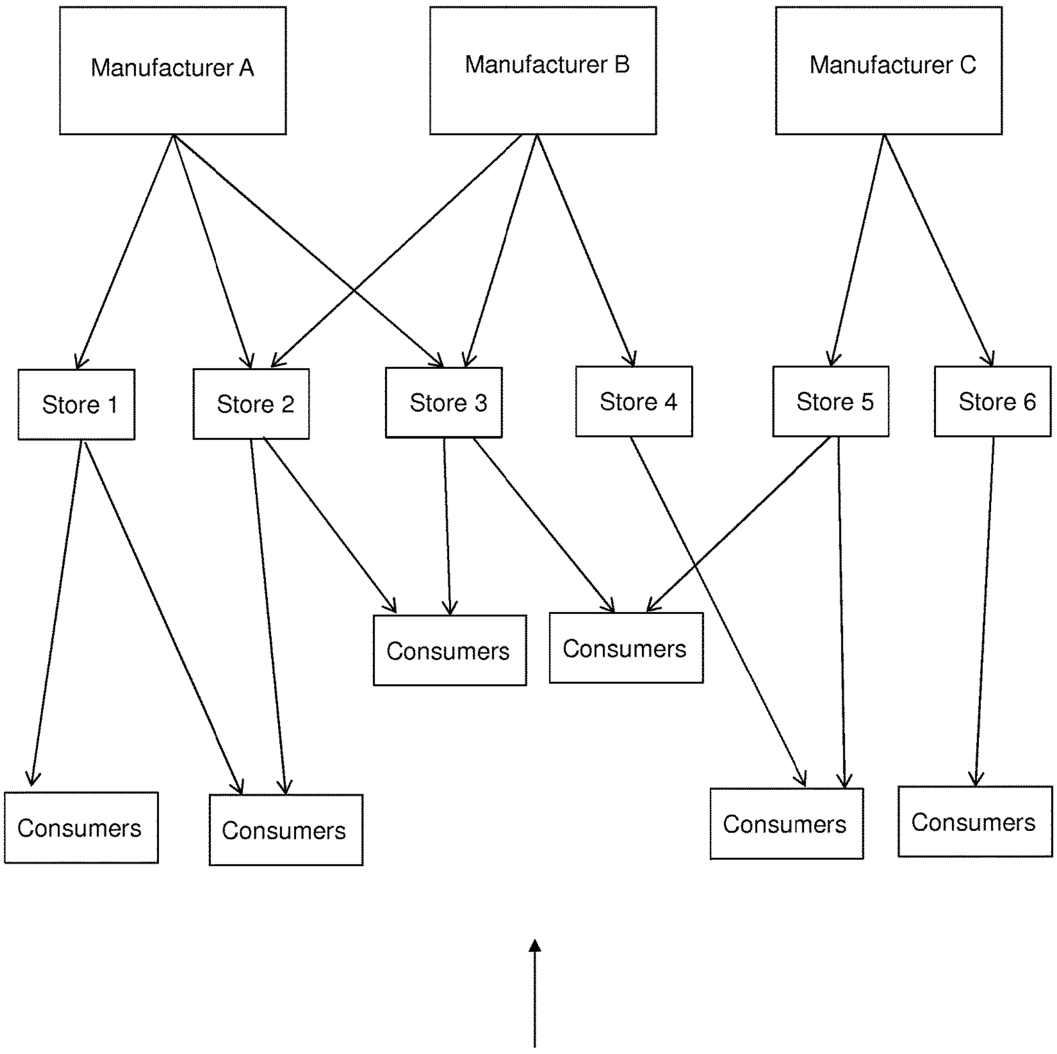
FIG. 18 is a schematic diagram illustrating sales networks between master account, sub-accounts, and consumers.

In one embodiment, additional master accounts from the same industry may join and connect with the system 100, and sell to, connect to, or otherwise interact with the same set of sub-accounts of other master accounts that were previously connected to the system 100. As an example and referring also to FIG. 18, a jewelry manufacturer, "Manufacturer A," may often sell through may of the same independent stores or retailers (Stores 1-6) as other jewelry manufacturers, such as "Manufacturer B" and Manufacturer C." For example, Manufacturer A and Manufacturer B may both sell to Store 2 and Store 3. In one embodiment, the manufacturers in FIG. 18 may correspond to master accounts and the stores may correspond to sub-accounts. As another example, travel agents may sign up with the system 100 as a sub-account of a franchise or buying group master account (e.g. a master account associated with a cruise planner), but also may sign up with the online portal through supplier websites, such as websites for cruise lines. In order to connect the travel agent to more than one master account that may be relevant to the travel agent, the system 100 may implement the concept of "networking groups."

A sub-account may network with any master account in the networking groups of the master accounts that they are connected to. In certain embodiments, there may be several types of networking groups, which may be set by the online portal or administrators of the online portal. For example, there may be a closed networking group type, a restricted networking group type, and an open networking group type. The networking group types may be set based on the industry associated with a master account, regulations related to the organization associated with the master account, the type of sub-accounts that would generally connect with the master account, by contractual agreement, or for any other desired purpose or reason. A closed networking group type may be a networking group in which a particular master account has direct control over a sub-account and through one or more business arrangements, can preclude the sub-account from marketing the products and services of a different master account. For example, a franchisor, which may be a master account, may have direct control over a franchisee, which may be a sub-account. The franchisor (master account) may prevent the franchisee (sub-account) from networking with other master accounts that are not associated with the franchisor. Another non-limiting example of a closed networking group scenario may occur in the context of an employer and employee relationship. If the employer is associated with the master account and the employee is associated with the sub-account, the sub-account may be prevented from networking with other master accounts that are not related to the master account for the employer. For example, an insurance company can allow their entire sales force to access the online portal, while at the same time preventing their entire sales force from accessing market resources, market programs, and accounts of other insurance companies or other types of companies that are connected to the online portal of the system 100.

A restricted networking group type may be a networking group in which a master account may allow a sub-account that is connected to the master account to access other master accounts, but may allow the online portal or the administrators of the online portal to control which additional networks (i.e. master accounts) that a user of the sub-account may view or access. In one embodiment, as long as the sub-account is not part of a closed network, the sub-account may inherit, as an aggregate, all restricted networking groups of all of the master accounts that they are linked to. As a result, when a sub-account logs into the online portal, the sub-account may be allowed to see and access more and more master accounts as they add additional master accounts to their network, such as illustrated in FIG. 2. In one embodiment, a sub-account may connect with a master account that is not listed in a restricted network, but may only do so by utilizing key, such as by using the processes described herein. As an example of a restricted networking group type, an organization may have multiple brands, companies, or both, that are utilizing the online portal to provide access to marketing programs and resources. The organization may want users to be able to view and access each of the master accounts associated with each of the multiple brands and companies associated with the organization.

An open networking group type may be a networking group in which a master account may sell through a local channel network that it does not directly control. In one embodiment of an open networking group, there may be no direct business agreements or contracts between a given master account and sub-account that indicate to the sub-account that the sub-account cannot access goods and services from another master account. For example, open networking groups may be common in relationships between cruise lines (i.e. master accounts) and travel agents (sub-accounts), jewelry manufacturers and jewelry retailers, and optical manufacturers and optical retailers. In one embodiment, a sub-account may access any master account that the sub-account wants to connect to as long as the sub-account has the correct key for the particular master account it wants to connect to. In one embodiment, the sub-account may locate other master accounts by utilizing a search function contained in the online portal of the system 100.

In a preferred embodiment, each master account can only have one networking group, and, as a result, only one networking group type. In certain other embodiments, a master account may have multiple networking group types and multiple networking groups. In one embodiment, only a primary master account may own or have a closed networking group. A primary master account may be the main master account for a particular organization. The organization, however, may have other secondary master accounts that are associated with the primary master account. These other master accounts may not be closed in nature, and may be restricted or open. In one embodiment, if a master account has an open networking group type, then no networking group needs to be created for the master account by the system 100, and a given sub-account may access all master accounts in the system 100, such as by utilizing accurate corresponding keys for these additional master accounts. In one embodiment, if a master account has a restricted networking group type, then by default, a sub-account may view or access only those master accounts that are associated with the master account the sub-account is already connected to.

In one embodiment, the administrators of the online portal or the online portal itself may control the sub-accounts networking abilities and settings by using the concept of networking groups. For example, the online portal administrators may set up a network group for a master account when the master account itself is created. Based on account types defined in service level agreements with the organization associated with the master account, the administrator of the online portal can set the primary master account as a closed network, and set secondary master accounts associated with the organization as restricted networking groups or even as open networking groups. In one embodiment, if a sub-account is signing up with the online portal for the first time, they may login by using a key provided by a particular master account or be automatically logged in using the single-sign-on process described herein. In one embodiment, once the sub-account signs up with the online portal and a given master account, the online portal may only display the master accounts that they are connected or may connect to on a "My Network Page" of the online portal.

In certain embodiments, various scenarios involving networking group types may operate as follows:

1. If a sub-account is already networked with a master account in an open networking group, then the sub-account may network to additional master accounts in an open networking group and access the additional master accounts' resources via the online portal. In one embodiment, the sub-account may network to these additional master accounts by using the appropriate keys for each of the additional master accounts.

2. If a sub-account is already networked with a master account in an open networking group and the sub-account is attempting to network to a master account in a restricted networking group, the sub-account may network to the master account in the restricted group, and view and access all master accounts the sub-account is connected to via the online portal.

3. If a sub-account is already networked with a master account in an open networking group and is attempting to network to a master account in a closed networking group, the sub-account may be allowed to network to the master account in the closed networking group, but only if the sub-account terminates the sub-account's networking relationship with any previous master accounts that the sub-account is connected to. In one embodiment, the online portal may provide a prompt to the sub-account, which asks the sub-account if they truly want to terminate the relationship with the previous master accounts before actually terminating the relationships.

4. If a sub-account is already networked with a master account in a restricted networking group and the sub-account is attempting to network to a master account in an open networking group, the sub-account may network to the master account in the open networking group and access all master accounts via the online portal.

5. If a sub-account is already networked with a master account in a restricted networking group and the sub-account is attempting to network to a master account in a restricted networking group, the sub-account may network to the master account in the restricted networking group. In one embodiment, the sub-account may view and access all master accounts in the restricted networking group of the new master account that the sub-account networked to, such as via the online portal.

6. If a sub-account is already networked with a master account in a restricted networking group and the sub-account is attempting to network to a master account in a closed networking group, the sub-account may be allowed to network to the master account in the closed networking group, but only if the sub-account terminates the sub-account's networking relationship with any previous master accounts that the sub-account is connected to that are outside the network of the master account that the sub-account is trying to network to. In one embodiment, the online portal may provide a prompt to the sub-account, which asks the sub-account if they truly want to terminate the relationship with the previous master accounts before the relationships are terminated.

7. If a sub-account is already networked with a master account in a closed networking group and the sub-account is attempting to network to a master account in an open networking group, the sub-account may network to the master account in the open networking group only if the master account is part of the closed network of the previous master account that the sub-account was already connected to. In one embodiment, the sub-account may be prevented by the system 100 from accessing master accounts that are outside of the closed networking group of the previous master account.

8. If a sub-account is already networked with a master account in a closed networking group and the sub-account is attempting to network to a master account in a restricted networking group, the sub-account may only network to the master account in the restricted networking group if the master account is part of the closed network of the previous master account that the sub-account was already connected to. In one embodiment, the sub-account may be prevented by the system 100 from accessing master accounts that are outside of the closed networking group of the previous master account that the sub-account was already connected to.

9. If a sub-account is already connected with a master account in a closed networking group and the sub-account is attempting to network to a master account in a closed networking group, the sub-account may only network to the new master account if the new master account is part of the closed networking group of the previous master account that the sub-account was already connected to. Otherwise, the sub-account may be prevented by the system 100 from accessing the new master account.

10. If a sub-account is already connected with a master account in a closed networking group and the sub-account is attempting to network to a master account in any networking group, the sub-account may only network to the new master account if the new master account is part of the closed networking group of the previous master account that the sub-account was already connected to. Otherwise, the sub-account may be prevented by the system 100 from accessing the new master account.

In one embodiment, the system 100 and methods described herein may further include utilizing any of the various components described in the system 100 to perform any of the operative functions disclosed herein. Furthermore, it is important to note that the methods described above may incorporate any of the functionality, devices, and/or features of the system 100 and subsystems described above, or otherwise, and are not intended to be limited to the description or examples provided herein.

Figure 19:
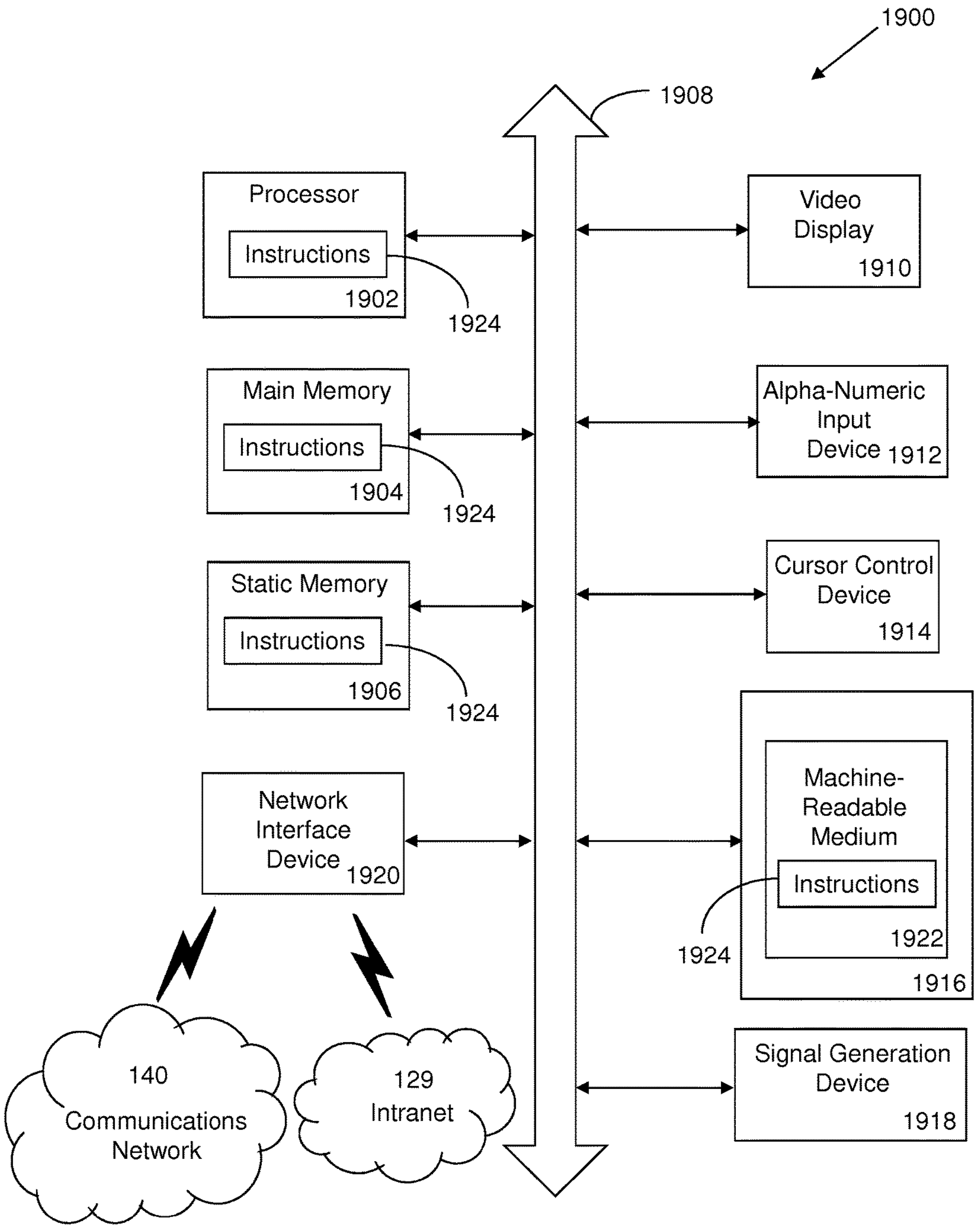
FIG. 19 is a schematic diagram of a machine in the form of a computer system within which a set of instructions, when executed, may cause the machine to perform any one or more of the methodologies of the system for providing access to a distributed marketing platform.

Referring now also to FIG. 19, at least a portion of the methodologies and techniques described with respect to the exemplary embodiments of the system 100 can incorporate a machine, such as, but not limited to, computer system 1900, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100.

In some embodiments, the machine operates as a standalone device. In some embodiments, the machine may be connected (e.g., using a communications network 140 or even the intranet 129 if necessary) to and assist with operations performed by other machines, such as, but not limited to, the server 145, the database 150, other devices in the system 100, or any combination thereof. The machine may be connected with any component in the system 100. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 1900 may include a processor 1902 (e.g., a central processing unit (CPU), a graphics processing unit (GPU, or both), a main memory 1904 and a static memory 1906, which communicate with each other via a bus 1908. The computer system 1900 may further include a video display unit 1910 (e.g., a liquid crystal display (LCD), a flat panel, a solid state display, or a cathode ray tube (CRT)). The computer system 1900 may include an input device 1912 (e.g., a keyboard), a cursor control device 1914 (e.g., a mouse), a disk drive unit 1916, a signal generation device 1918 (e.g., a speaker or remote control) and a network interface device 1920.

The disk drive unit 1916 may include a machine-readable medium, computer-readable device, or machine-readable device 1922 on which is stored one or more sets of instructions 1924 (e.g., software) embodying any one or more of the methodologies or functions described herein, including those methods illustrated above. The instructions 1924 may also reside, completely or at least partially, within the main memory 1904, the static memory 1906, or within the processor 1902, or a combination thereof, during execution thereof by the computer system 1900. The main memory 1904 and the processor 1902 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium, computer-readable device, or machine-readable or device 1922 containing instructions 1924 so that a device connected to the communications network 140 or even the intranet 129 can send or receive voice, video or data, and to communicate over the communications network 140 (or intranet 129) using the instructions. The instructions 1924 may further be transmitted or received over the communications network 140 or even the intranet 129, via the network interface device 1920.

While the machine-readable medium or device 1922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium or device that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Many other arrangements will be apparent to those of skill in the art upon reviewing the above description. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A method for providing access to a distributed marketing platform, the method comprising:

receiving, from a device of a user, a first request to access an online portal associated with a master account, wherein the online portal provides access to resources provided by the master account;

generating, by utilizing the online portal, a digital key comprising a unique combination of digital text characters, a unique web link, and a unique media file comprising media content;

receiving and processing, at the online portal and from a device of the master account and via a separate portal within an intranet of the master account, a data packet including a master account identifier, a third party identifier, and the digital key generated in response to the first request to access the online portal, wherein the master account identifier uniquely identifies the master account, wherein the third party identifier uniquely identifies the user, wherein the digital key comprises the unique combination of digital text characters, the unique web link, and the unique media file comprising the media content;

receiving, at the online portal and from the device of the master account, rules associated with the digital key;

determining, by utilizing instructions from memory that are executed by a processor, if the user has a sub-account with the online portal based on the master account identifierand the third party identifier of the data packet, wherein the sub-account identifies the user as a local affiliate of a brand of the master account;

transmitting, to the device of the user, a prompt to register the sub-account with the online portal if the user is determined to not have the sub-account with the online portal;

receiving, from the device of the user, a request to register the sub-account with the online portal in response to the prompt;

providing the sub-account with access to the online portal, based on a key provided by the sub-account matching the digital key, based on the rules associated with the digital key and based on the request to register the sub-account with the online portal, wherein the rules associated with the digital key specify a portion of the online portal that the sub-account is authorized to access, a first resource of the resources that the sub-account is authorized to access, when the sub-account accesses the portion of the online portal, how long the digital key is useable, and how often the digital key is useable, wherein the access to the online portal provides access to the resources provided by the master account;

determining, for the sub-account and based on a repeat of a registration process, potential additional master accounts to be presented on a graphical user interface of the online portal with the master account; and presenting, to the device of the user, the potential additional master accounts with the master account on the graphical user interface of the online portal as separate networks that are each separately accessible by the sub-account via the online portal, wherein the sub-account networks with a new master account of the potential additional master accounts when the new master account is within a same closed networking group of the master account.

2. The method of claim 1, further comprising limiting a level of the access to the resources provided by the master account based on the rules that are set by the master account that are associated with the digital key and the sub-account.

3. The method of claim 1, further comprising receiving the data packet in response to the first request to access the online portal associated with the master account, wherein the first request to access the online portal associated with the master account is a single sign-on request.

4. The method of claim 1, further comprising storing the file associated with the browser of the user when the request to register the sub-account with the online portal is approved, wherein the file comprises the master account identifier, the third party identifier, and a sub-account identifier associated with the online portal.

5. The method of claim 4, further comprising receiving a second request to access the online portal after the sub-account is registered with the online portal, and further comprising enabling the sub-account, in response to the second request, to access the resources provided by the master account based on matching information in the file with the master account identifier and the third party identifier of the data packet.

6. The method of claim 4, further comprising receiving a second request to access the online portal after the sub-account is registered with the online portal, and further comprising transmitting instructions to cause the device of the user to present a login screen to enter a username and a password if the file is not found.

7. The method of claim 6, further comprising enabling the sub-account, in response to the second request, to access the online portal if the username and the password are received from the device of the user.

8. The method of claim 1, further comprising registering the sub-account with the online portal if the request to register the sub-account has been approved.

9. The method of claim 1, further comprising transmitting, to the device of the user, an indication of an assignment of the sub-account to a subgroup associated with the master account, wherein the assignment to the subgroup is based on the rules that are set by the master account that are associated with the digital key and the sub-account.

10. The method of claim 1, wherein the resources provided by the master account comprise one or more of marketing programs, marketing materials, marketing funds, and marketing assets.

11. The method of claim 1, further comprising enabling the sub-account to access a different master account using the online portal.

12. A non-transitory computer-readable device comprising instructions, which when executed by a processor, cause the processor to perform operations comprising:

receiving, from a device of a user, a request to access an online portal associated with a master account, wherein the online portal provides access to resources provided by the master account;

generating, by utilizing the online portal, a digital key comprising a unique combination of digital text characters, a unique web link, and a unique media file comprising media content;

receiving and processing, at the online portal and from a device of the master account and via a separate portal within an intranet of the master account, a data packet including a master account identifier, a third party identifier, and the digital key generated in response to the request to access the online portal, wherein the master account identifier uniquely identifies the master account, wherein the third party identifier uniquely identifies the user, wherein the digital key comprises the unique combination of digital text characters, the unique web link, and the unique media file comprising the media content;

receiving, at the online portal and from the device of the master account, rules associated with the digital key;

determining, by utilizing instructions from memory that are executed by a processor, if the user has a sub-account with the online portal based on the master account identifier and the third party identifier of the data packet, wherein the sub-account identifies the user as a local affiliate of a brand of the master account;

determining whether information in a file of the user matches with the master account identifier and the third party identifier of the data packet;

providing the sub-account with access to the online portal if the user is determined to have the sub-account, based on a key provided by the sub-account matching the digital key, based on the rules associated with the digital key, and if information in the file of the user matches with the master account identifier and the third party identifier of the data packet, wherein the rules associated with the digital key specify a portion of the online portal that the sub-account is authorized to access, a first resource of the resources that the sub-account is authorized to access, when the sub-account can access the portion of the online portal, how long the digital key may be used, and how often the digital key may be used;

determining, for the sub-account and based on a repeat of a registration process, potential additional master accounts to be presented on a graphical user interface of the online portal with the master account; and presenting, to the device of the user, the potential additional master accounts with the master account on the graphical user interface of the online portal as separate networks that are each separately accessible by the sub-account via the online portal, wherein the sub-account networks with a new master account of the potential additional master accounts only if the new master account is within a same closed networking group of the master account.

* * * * *